United States Patent
Zhao et al.

(10) Patent No.: US 12,316,941 B2
(45) Date of Patent: May 27, 2025

(54) PERISCOPIC CAMERA MODULE AND ELECTRONIC DEVICE

(71) Applicant: NINGBO SUNNY OPOTECH CO., LTD, Zhejiang (CN)

(72) Inventors: Bojie Zhao, Zhejiang (CN); Lifeng Yao, Zhejiang (CN); Dongli Yuan, Zhejiang (CN); Sisi Yu, Zhejiang (CN); Zhen Huang, Zhejiang (CN)

(73) Assignee: NINGBO SUNNY OPOTECH CO., LTD, Zhejiang (CN)

( * ) Notice: Subject to any disclaimer, the term of this patent is extended or adjusted under 35 U.S.C. 154(b) by 167 days.

(21) Appl. No.: 17/761,386

(22) PCT Filed: Aug. 27, 2020

(86) PCT No.: PCT/CN2020/111620
§ 371 (c)(1),
(2) Date: Mar. 17, 2022

(87) PCT Pub. No.: WO2021/052136
PCT Pub. Date: Mar. 25, 2021

(65) Prior Publication Data
US 2022/0294945 A1    Sep. 15, 2022

(30) Foreign Application Priority Data

Sep. 18, 2019 (CN) .......................... 201910879844.0
Sep. 18, 2019 (CN) .......................... 201910879861.4
Sep. 18, 2019 (CN) .......................... 201910879872.2

(51) Int. Cl.
*H04N 23/55* (2023.01)
*H04M 1/02* (2006.01)

(52) U.S. Cl.
CPC .......... *H04N 23/55* (2023.01); *H04M 1/0264* (2013.01); *H04M 2250/52* (2013.01)

(58) Field of Classification Search
CPC ..... H04N 23/55; H04N 23/57; H04M 1/0264; H04M 2250/52; G02B 1/11; G02B 5/005;
(Continued)

(56) References Cited

U.S. PATENT DOCUMENTS 5,914,479 A      6/1999  Fikes et al.
2003/0209661 A1* 11/2003  Chen ..................... G02B 7/026
                                                                250/239

(Continued)

FOREIGN PATENT DOCUMENTS

CN          1245573      2/2000
CN        202975377      6/2013
(Continued)

OTHER PUBLICATIONS

International Search Report issued Oct. 30, 2020, in International (PCT) Application No. PCT/CN2020/111620, with English translation.

(Continued)

*Primary Examiner* — Usman A Khan
(74) *Attorney, Agent, or Firm* — WENDEROTH, LIND & PONACK, L.L.P.

(57) ABSTRACT

A periscopic camera module, including: a first reflective element including a first reflective surface and used to reflect incident light and make the incident light longitudinally turn; an optical lens used to receive the light reflected by the first reflective element and output an imageable light beam to an image space; a second reflective element including at least one second reflective surface and adapted to make the imageable light beam transversely turn at least once; and a photosensitive chip adapted to receive the transversely turned imageable light beam, wherein at least one of all optical surfaces of the first reflective element and the second reflective element is provided with a light blocking struc-
(Continued)

ture, and the light blocking structure is arranged at an edge region of the at least one optical surface; and the optical surface includes a reflective surface, an incident surface, or an exit surface. The volume of the periscopic camera module can be reduced such that the structure of the periscopic camera module is more compact, and it can be better adapted to an optical lens with a large focal length, and can reduce or avoid the risk of introduction of stray light.

18 Claims, 19 Drawing Sheets

(58) Field of Classification Search
CPC .... G02B 13/0065; G02B 5/20; G02B 27/646; G03B 11/045; G03B 30/00; G03B 2205/0023; G03B 2205/0069; G03B 17/17
USPC .......................................................... 348/369
See application file for complete search history.

(56) References Cited

U.S. PATENT DOCUMENTS

| | | | |
|---|---|---|---|
| 2006/0006485 A1* | 1/2006 | Mouli | H01L 27/14627 257/432 |
| 2006/0092524 A1* | 5/2006 | Konno | G02B 13/0065 359/678 |
| 2009/0153985 A1* | 6/2009 | Nagaoka | G02B 7/1805 359/733 |
| 2011/0242653 A1* | 10/2011 | Ouderkirk | G02B 27/286 359/487.04 |
| 2012/0076479 A1 | 3/2012 | Okuda | |
| 2012/0218644 A1 | 8/2012 | Lu et al. | |
| 2014/0049833 A1* | 2/2014 | Totani | G02B 27/0172 359/633 |
| 2015/0286033 A1* | 10/2015 | Osborne | G03B 3/10 348/345 |
| 2016/0012269 A1* | 1/2016 | Kowalczyk | G06K 7/10881 235/462.21 |
| 2018/0299593 A1 | 10/2018 | Wei | |
| 2019/0246490 A1 | 8/2019 | Li et al. | |
| 2020/0041784 A1 | 2/2020 | Wang | |
| 2020/0408902 A1* | 12/2020 | Katayama | G06T 7/97 |
| 2022/0091373 A1* | 3/2022 | Saiga | G02B 13/007 |

FOREIGN PATENT DOCUMENTS

| | | |
|---|---|---|
| CN | 206096610 | 4/2017 |
| CN | 206115002 | 4/2017 |
| CN | 107515459 | 12/2017 |
| CN | 206920791 | 1/2018 |
| CN | 107682599 | 2/2018 |
| CN | 206993252 | 2/2018 |
| CN | 108663775 | 10/2018 |
| CN | 109246268 | 1/2019 |
| CN | 109348096 | 2/2019 |
| CN | 208581282 | 3/2019 |
| CN | 208581283 | 3/2019 |
| CN | 208636492 | 3/2019 |
| CN | 209387963 | 9/2019 |
| EP | 2 053 440 | 4/2009 |
| EP | 3 006 984 | 4/2016 |
| JP | 2006-171449 | 6/2006 |
| WO | 2018/035944 | 3/2018 |
| WO | 2019/008517 | 1/2019 |

OTHER PUBLICATIONS

Extended European Search Report issued Oct. 20, 2022 in corresponding European Patent Application No. 20864641.4.

* cited by examiner

PERISCOPIC CAMERA MODULE AND ELECTRONIC DEVICE

RELATED APPLICATIONS

This application claims three priority rights of the Chinese Patent Application No. 201910879861.4 filed on Sep. 18, 2019, under the title "Periscopic Camera Module and Electronic Equipment", the Chinese patent application number 201910879844.0 filed on Sep. 18, 2019, under the title "Periscopic Camera Module and Corresponding Electronic Equipment", and the Chinese patent application number 201910879872.2 filed on Sep. 18, 2019, under the title "Periscopic Camera Module and Electronic Equipment", and the entire contents of the above three applications are hereby incorporated by reference.

FIELD OF THE INVENTION

The present application relates to the technical field of camera module, and in particular, the present application relates to a solution of a periscopic camera module and corresponding electronic device.

BACKGROUND OF THE INVENTION

With the popularization of mobile electronic devices, the related technologies of camera modules used in mobile electronic devices to help users obtain images (such as videos or images) have been rapidly developed and advanced, and in recent years, camera modules has been widely used in many fields such as medical treatment, security, industrial production and so on. In order to meet more and more extensive market demands, high pixel, large chip, small size, and large aperture are the irreversible development trends of existing camera modules.

At present, people's demand for camera functions of portable electronic devices (such as tablet computers, smart phones, etc.) is still increasing rapidly. The camera modules configured in electronic devices gradually realize background blur, night shooting, dual-camera zoom and many other functions. Herein, due to the application of the periscopic camera module, the capability of dual-camera zoom is gradually increasing. For example, its optical zoom capability has been increased from 2x zoom to 3x zoom or even 5x zoom. It can be said that the periscopic camera module has greatly changed people's perception of the photographic capability of portable electronic devices (such as smart phones), and has broad market prospects.

However, the existing periscopic camera modules have problems such as large size and complex structure. Inside of a portable electronic device, such as a smartphone, can be said to be an inch of land. If the periscopic camera module occupies a large space, the size of other accessories such as batteries and motherboards will be sacrificed, which is not conducive to enhancing the comprehensive value of the mobile phone. Therefore, people expect the periscopic camera module to be reduced in size and more compact in structure.

On the other hand, the specialty of the periscopic camera module is mainly telephoto, that is, to clearly capture distant pictures. As a result, the periscopic camera module often needs to be equipped with an optical lens with a larger focal length in order to be used as a telephoto camera module. Under the limitation of optical theory, the optical path constructed based on the optical lens with large focal length needs to have sufficient length, which becomes one of the difficulties in reducing the size of the periscopic camera module of mobile phones.

Further, the current consumer electronics market is in huge demand, and products are updated very quickly. Therefore, it is also expected that the design solution of the camera module used in portable electronic devices (e.g., smart phones) is suitable for mass production, and contributes to the improvement of production efficiency and production yield.

Furthermore, the periscopic module is different from ordinary modules in that its optical path has a turning point, which causes the light to be easily reflected by the structural parts (such as the edge of the lens barrel, the edge of the reflective element, the edge of the bracket, etc.) during the shuttle process, resulting in stray light, which is not conducive to improving the imaging quality. The telephoto camera module is usually larger than the ordinary camera module, and the number of optical elements is large and complex, which may increase the difficulty of module assembly and the complex assembly process. Therefore, at the time of solving the stray light problem, it is also necessary to consider how to simplify the structure of the camera module and how to improve the integration of optical elements and various supporting structures.

SUMMARY OF THE INVENTION

The purpose of the present application is to overcome the conventional deficiencies and provide a solution that can reduce the volume occupied by the periscopic camera module.

In order to solve the above technical problems, the present application provides a periscopic camera module including: a first reflective element, an optical lens, a second reflective element, and a photosensitive chip. Wherein, the first reflective element is for reflecting incident light to turn it longitudinally, and the optical lens is for receiving light reflected by the first reflective element and outputting an imageable light beam to an image side, and the second reflective element includes at least one second reflective surface adapted for laterally turning the imageable light beam at least once, and the photosensitive chip is adapted to receive the imageable light beam laterally turned by the second reflective element. Wherein, among all optical surfaces of the first reflective element and the second reflective element, at least one of the optical surfaces has a light-blocking structure, and the light-blocking structure is provided in an edge region of the at least one optical surface. Wherein the optical surfaces include a reflective surface, an incident surface or an exit surface, and the reflective surface includes the first reflective surface or the second reflective surface.

Wherein, the first reflective element is a prism, and the prism includes an incident surface and an exit surface, and the light-blocking structure is provided at an edge region of the incident surface and/or an edge region of the exit surface.

Wherein, the second reflective element is a prism, and the prism includes an incident surface and an exit surface, and the light-blocking structure is provided at an edge region of the incident surface and/or the exit surface.

Wherein, the first reflective element and/or the second reflective element is a reflect mirror, and the reflect mirror has a reflective surface, and the light-blocking structure is provided at an edge region of the reflective surface.

Wherein, the first reflective surface is a 45-degree reflective surface, and the second reflective element includes at least two second reflective surfaces, and the second reflective surface is a 45-degree reflective surface.

Wherein, a transverse cross section of the second reflective element is a parallelogram, and two mutually parallel side surfaces of the second reflective element constitute two of the second reflective surfaces, and two end surfaces of the second reflective element respectively constitute the incident surface and the exit surface of the second reflective element.

Wherein, the second reflective element includes a plurality of groups of the second reflective surfaces, each group has two second reflective surfaces and the two second reflective surfaces are parallel to each other, and any two adjacent groups of the second reflective surfaces are arranged in a "V" shape or an inverted "V" shape; and the second reflective element is a single prism, a side surface of the prism constitutes the second reflective surface, and two end surfaces of the prism respectively constitute the incident surface and the exit surface of the second reflective element.

Wherein, the light-blocking structure is provided at the second reflective surface.

Wherein, the light-blocking structure is further provided at the incident surface and/or the exit surface of the second reflective element.

Wherein, the light-blocking structure is further provided at the first reflective surface, the incident surface and/or the exit surface of the first reflective element.

Wherein, a light-passing hole is formed in a center of the light-blocking structure, and the shape of the light-passing hole is a circle, an ellipse or a rectangle.

Wherein, the light-blocking structure is provided at a plurality of the optical surfaces, and the light-blocking structure includes a first light-blocking structure and a second light-blocking structure, wherein the first light-blocking structure has a circular or oval light-passing hole, and the second light-blocking structure has a rectangular light-passing hole, and the first light-blocking structure is provided at one or more optical surfaces close to an object side, and the second light-blocking structure is provided at one or more optical surfaces close to an image side.

Wherein, the first reflective element is a triangular prism, an inclined surface of the triangular prism is the first reflective surface, and two mutually perpendicular side surfaces of the triangular prism are the incident surface and the exit surface of the first reflective element, respectively.

Wherein, the incident surface of the first reflective element has a visible light anti-reflective coating film and a color filter film; or the exit surface of the first reflective element has a visible light anti-reflective coating film and a color filter film; or the incident surface of the first reflective element has a visible light anti-reflective coating film, and the exit surface of the first reflective element has a color filter film.

Wherein, the second reflective element is a prism, and the second reflective element has an incident surface and an exit surface; wherein, at least one of four optical surfaces of the incident surface and the exit surface of the first reflective element, and the incident surface and the exit surface of the second reflective element has a visible light anti-reflective coating film, and at least one of the four optical surfaces has a color filter film.

Wherein, at least one of the optical surfaces of the first reflective element and the second reflective element has a visible light anti-reflective coating, film and at least one of the optical surfaces has a color filter film, and both of the visible light anti-reflective coating film and the color filter film are provided in the light-passing holes of the light-blocking structure.

Wherein, the visible light anti-reflective coating film and the color filter film are located on a same optical surface.

Wherein, the visible light anti-reflective coating film and the color filter film are respectively located on different optical surfaces.

Wherein, the optical lens includes at least three lenses, and an outline of a clear aperture of the lens is circular or at least a part of the outline is arc-shaped.

Wherein, the optical lens has an effective focal length greater than or equal to 15 mm or a field angle of less than or equal to 25 degrees.

Wherein, the optical lens has an effective focal length greater than or equal to 18 mm or a field angle of less than or equal to 20 degrees.

Wherein, the optical lens has an effective focal length greater than or equal to 25 mm or a field angle of less than or equal to 15 degrees.

Wherein, the light-blocking structure is a thin film fabricated on the optical surface of the first reflective element or the second reflective element by silk screen printing, plating, coating or ink printing process; or the light-blocking structure is a light-blocking member directly formed on the optical surface of the first reflective element or the second reflective element; or an annular groove is provided on the optical surface of the first reflective element or the second reflective element, and the light-blocking structure is a pre-shaped light-blocking member embedded in the annular groove.

According to another aspect of the present application, there also provides an electronic device, including: any of the aforementioned periscopic camera modules, wherein an incident direction of the incident light of the first reflective element is the same as that of a thickness direction of the electronic device.

Compared with the conventional camera module, the present application has at least one of the following technical effects:

1. The present application can reduce the volume of the periscopic camera module and make the structure of the periscopic camera module more compact.
2. The present application can better adapt to optical lenses with larger focal lengths.
3. The periscopic camera module of the present application is suitable for mass production, and helps to improve production efficiency and production yield.
4. The periscopic camera module of the present application can reduce the loss caused by the light beam passing through different media, so as to ensure that the photosensitive chip has enough light receiving amount, thereby improving the imaging quality.
5. The periscopic camera module of the present application can suppress the stray light caused by the turning of the optical path, thereby improving the imaging quality.
6. The present application does not require additional independent shading elements, which helps to reduce the volume of the camera module.
7. In the present application, an anti-reflective coating film, a color filter film or the like can be arranged on the surface of the optical reflective element, thereby avoiding the use of a separate color filter and helping to reduce the volume of the module.
8. The present application can suppress or avoid the risk of introducing stray light caused by a long optical path and multiple turns of the optical path by arranging light-shielding structures on multiple reflective surfaces, thereby ensuring the imaging quality of the module.

9. In the present application, light-shielding members with different shapes of light-passing holes can be arranged on different optical surfaces (the optical surfaces includes the incident surface, the reflective surface, and the exit surface), so that the light receiving amount at different regions of the photosensitive chip is approximately uniform, thereby improving the imaging quality.

10. The periscopic camera module of the present application may have an anti-shake function.

11. The periscopic camera module of the present application may have a zoom function.

12. The periscopic camera module of the present application can realize anti-shake and zoom functions (especially high-power zoom capability) with a small occupied space.

DETAIL DESCRIPTION OF THE INVENTION

Figure 1:
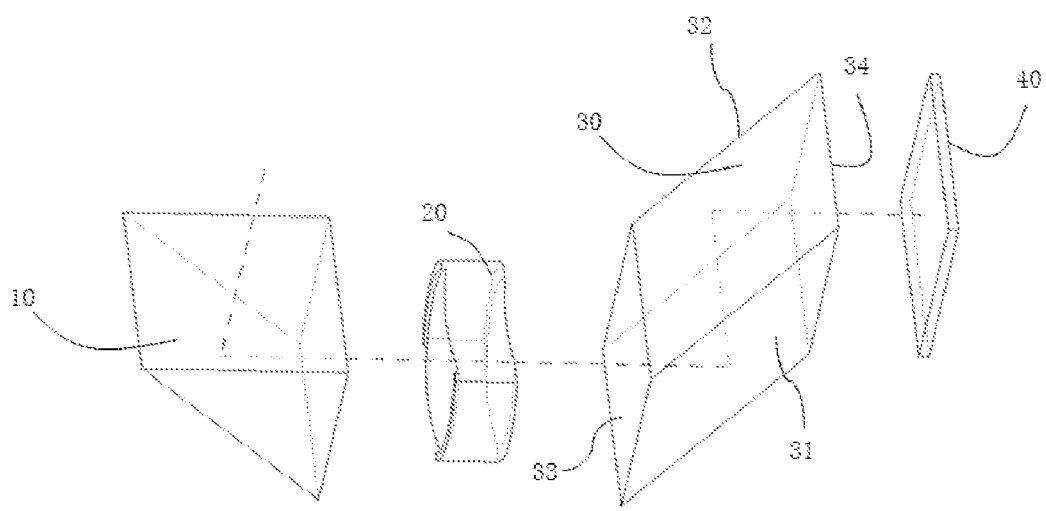
FIG. 1 shows a schematic perspective view of an optical path and optical elements of a periscopic camera module in an example of the present application.

For a better understanding of the present application, various aspects of the present application will be described in more detail with reference to the accompanying drawings. It should be understood that these detailed descriptions are merely illustrative of exemplary examples of the present application and are not intended to limit the scope of the present application in any way. Throughout the specification, the same reference numerals refer to the same elements. The expression "and/or" includes any and all combinations of one or more of the associated listed items.

It should be noted that in this specification, the expressions first, second, etc. are only used to distinguish one feature from another feature and do not imply any limitation on the feature. Accordingly, the first main body discussed below could also be referred to as a second main body without departing from the teachings of the present application.

In the drawings, the thickness, size and shape of objects have been slightly exaggerated for convenience of explanation. The drawings are examples only and are not drawn strictly to scale.

It will also be understood that the terms "include", "including", "have", "comprise" and/or "comprising" when used in this specification mean the presence of stated features, integers, steps, operations, elements and/or components, but do not preclude the presence or addition of one or more other features, integers, steps, operations, elements, components and/or combinations thereof. Also, when the expression like "at least one of . . . " appears after a list of listed features, it modifies the entire listed feature and not the individual elements of the list. Further, when describing examples of the present application, the use of "may" means "one or more examples of the present application." Also, the term "exemplary" is intended to refer to an example or illustration.

As used herein, the terms "substantially", "approximately" and similar terms are used as terms indicating approximation and not as terms indicating degree, and are intended to describe inherent bias in measured or calculated values that would be recognized by those of ordinary skill in the art. Unless otherwise defined, all terms (including technical and scientific terms) used herein have the same meaning as commonly understood by one of ordinary skill in the art to which this application belongs. It should also be understood that terms (such as those defined in commonly used dictionaries) should be interpreted to have meanings consistent with their meanings in the context of the related art, and will not be interpreted in an idealized or overly formal sense unless it is expressly so limited herein.

It should be noted that the examples in the present application and the features of the examples may be combined with each other in the case of no conflict.

FIG. 1 shows a schematic perspective view of an optical path and optical elements of a periscopic camera module in an example of the present application. Referring to FIG. 1, in this example, the periscopic camera module includes a first reflective element 10, an optical lens 20, a second reflective element 30 and a photosensitive chip 40 arranged in sequence along the optical path. Herein, the first reflective element 10 is used to reflect incident light and make it turn 90 degrees in the longitudinal direction (it should be noted that in this example, a certain tolerance is allowed for the turning angle, that is, if the turning angle of the light beam is within the tolerance range, it can be regarded as turning 90 degrees). The optical lens 20 is used for receiving the light reflected by the first reflective element 10 and outputting an imageable light beam to an image side. The second reflective element 30 includes two reflective surfaces adapted to laterally turn the imageable light beam twice. The photosensitive chip 40 is adapted to receive the imageable light beam laterally turned by the second reflective element 30. It should be noted that in order to show the optical path more clearly, the module housing, driver, bracket, IR color filter, connection structure between optical elements, circuit board components and other structures are omitted in FIG. 1. It should be understood that in FIG. 1, these omitted structure may be part of the periscopic camera module. In this example, the longitudinal direction refers to an incident direction of incident light of the first reflective element, that is, the incident direction of the incident light of the entire periscopic camera module, and the lateral direction refers to the direction perpendicular to the longitudinal direction.

The imaging optical path of the periscopic camera module of this example will be described in more detail below. First, the incident light is reflected by a first reflective surface of the first reflective element 10, and then turns 90 degrees in the longitudinal direction to reach the optical lens. Herein, the optical lens 20 may include at least three lenses. Next, light beam passes through the optical lens 20 to the second reflective element 30 and is reflected by it's second reflective surface reached firstly, the light beam is laterally turned by about 90 degrees and reaches another second reflective surface of the second reflective element 30, and then the light beam is then turned laterally by about 90 degrees, and finally reaches the photosensitive chip 40. In this example, the first reflective element 10 and the second reflective element 30 may both be prisms. In other examples, the first reflective element 10 and the second reflective element 30 may both be reflect mirrors, or the first reflective element 10, the second reflective element 30 may be a combination of a reflect mirror and a prism. A reflective surface of the prism can be realized based on the principle of total reflection, and A reflective surface of the reflect mirror can be realized based on the principle of specular reflection. In this example, both of the first reflective surface and the second reflective surface may be 45-degree reflective surfaces. It should be noted that, considering the manufacturing and assembly tolerances, arrangement angles of the first reflective surface and the second reflective surface are not required to be absolutely equal to 45 degrees, as long as the angles are within the tolerance range, they can be regarded as 45-degree reflective surfaces. More specifically, the 45-degree reflective surface can be understood as a reflective surface at an angle of about 45 degrees to the incident light. In this application, a deviation value is within 5 degrees, which can be regarded as a normal tolerance. For example, when the angle between the two is 40-50 degrees, it can be regarded as an angle of 45 degrees between the two; when the angle between the two is within the range of ±5 degrees, the two can be regarded as parallel; when the angle between the two is 85-95 degrees, the two can be regarded as vertical. Further, in this example, the first reflective element 10 is a triangular prism, an inclined surface of the triangular prism is the first reflective surface 11, and two mutually perpendicular side surfaces of the triangular prism are respectively used as an incident surface 12 and an exit surface 13 of the first reflective element.

Figure 3:
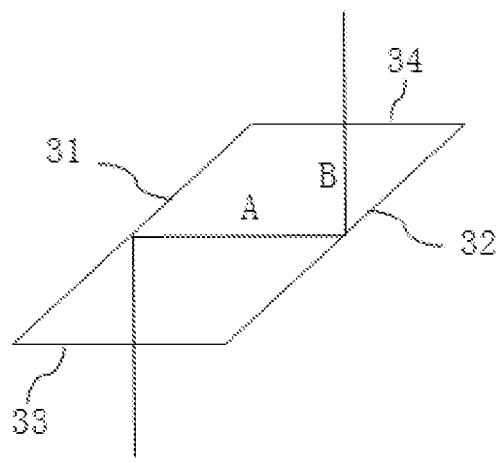
FIG. 3 shows a schematic diagram of an internal light path of a second reflective element 30.

The periscopic camera module of this example is a telephoto periscopic module. The telephoto periscopic module can have an effective focal length greater than or equal to 15 mm, or it can have a field angle of less than or equal to 25 degrees. Generally speaking, a longer focal length must have a longer back focal length (the distance between a surface of the last optic lens of a camera lens and the photosensitive chip), because an image will be clear only when the photosensitive chip is near the focal length. If a design of a conventional periscopic module is adopted (prism-lens-photosensitive chip are in a straight line), a overall length of a periscopic camera module with an effective focal length greater than or equal to 15 mm will be very large (for example, 20 mm or more, or even 25 mm) above), which would take up a lot of space inside a phone, which is not desirable. Therefore, in this example, in order to reduce an overall length of the telephoto periscopic module, a reflective element is provided behind the lens to turn the light again. Further, FIG. 3 shows a schematic diagram of an internal optical path of a second reflective element 30. As shown in FIG. 1 and FIG. 3, in this example, the second reflective element 30 is provided behind the optical lens, and the second reflective element 30 is a prism, and the prism is provided with two second reflective surfaces 31 and 32 (which can be realized based on the principle of total reflection), and the two second reflective surfaces 31 and 32 are basically parallel, the light is incident from an incident surface 33, and first undergoes an about 90-degree lateral turning A in the second reflective element 30, and then performs an about 90-degree lateral turning B, so as to restore a direction of the light beam entering the second reflective element 30, and finally exit from an exit surface 34. This design can reduce the overall length of the periscopic module, and the reduced length is about length of the lateral turning A. Further, in this example, the incident direction of the incident light entering the first reflective element 10 is parallel to a photosensitive surface of the photosensitive chip 40.

Figure 2:
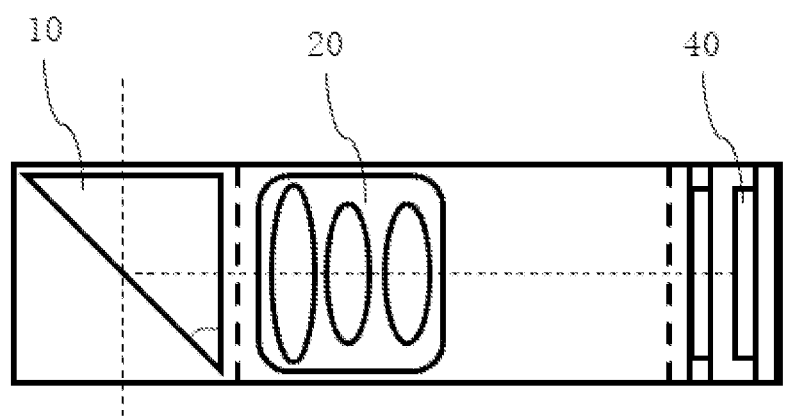
FIG. 2 shows a schematic diagram of principle of an optical path of a periscopic camera module of a comparative example.

More specifically, FIG. 2 shows a schematic diagram of an optical path principle of a periscopic camera module of a comparative example. This comparative example adopts a typical structure of a periscopic camera module currently used in a mobile phone. Referring to FIG. 2, in this comparative example, each of the optical elements are basically arranged in a straight line. That is, after entering the first reflective element, the incident light is longitudinally turned by 90 degrees, passes through the optical lens, and then enters the photosensitive chip along a straight line. However, for high-power telephoto modules (sometimes called telephoto modules), it often needs to be equipped with an optical lens with a larger focal length. For clear imaging, the photosensitive chip needs to be provided near the focal point. As a result, in a periscopic camera module with a conventional structure, the photosensitive chip has to be provided far away from a rear end face of the lens, so that a length of the periscopic camera module is long, which is not conducive to reducing electronic equipment interior space occupied by the camera module. In the example shown in FIG. 1 of the present application, the imageable light beam passing through the optical lens is folded by providing a second reflective element in a rear focal section of the camera module, so that the photosensitive chip can be arranged closer to a position of the optical lens, thereby making a structure of the camera module compact and helping to reduce a volume occupied by the camera module.

Further, still referring to FIG. 1, in an example of the present application, the second reflective element 30 is a prism, and a transverse cross section of the prism is a parallelogram, and two mutually parallel side surfaces of the prism constitute the two second reflective surfaces 31 and 32. Since the refractive index n of the prism is usually greater than 1, it is assumed that the light travels a distance of length L in the second reflective element 30, and in terms of optics, it can be considered that the light travels a distance of length nL (that is, the optical path of light in the prism), so providing the prism behind the optical lens as the second reflective element 30 can reduce the overall optical path by a length of (nL−L). From this perspective, the photosensitive chip can also be provided at a position closer to the rear end face of the optical lens, thereby making the structure of the camera module compact and helping to reduce the volume occupied by the camera module. Further, still referring to FIG. 1, in an example of the present application, a prism of which a transverse cross section is a parallelogram is used as the second reflective element 30, and the two end faces of the prism constitute the incident surface 33 and the exit surface 34 of the second reflective element 30 respectively. This design helps reduce losses due to light beams traversing different media. Specifically, in the prior art, a triangular prism or a reflect mirror is usually used to realize the reflective surface. Herein, a shape of the triangular prism can refer to the first reflective element 10 in FIG. 1. The inclined surface of the triangular prism is usually the reflective surface, and the two mutually perpendicular side surfaces can be used as the incident surface and the exit surface respectively. If one want the light to turn at least twice behind the optical lens, then a conventional practice is to provide two prisms behind the lens. However, in this example, a prism of which a transverse cross section is a parallelogram is used as the second reflective element 30, and its volume is smaller than that of two triangular prisms. Further, for a scheme of using two prisms to realize two second reflective surfaces, a process of the light going through will be prism-air-prism, so that the light will inevitably be lost at an interface between the prism and the air. For an telephoto periscopic module with insufficient light intake, this loss may be unbearable. In this example, however, the two second reflective surfaces 31 and 32 are integrated on a single reflective element, that is, integrated on one prism whose transverse cross section is a parallelogram. In this way, number of the second reflective elements is reduced, assembly difficulty is reduced, and the volume increase caused by multiple reflective elements is avoided. Furthermore, compared with the solution of two triangular prisms, this example can reduce one extra incident surface and one extra exit surface, and the light is only transmitted in one and the same prism, which can reduce the light in the process of prism-air-prism, which ensures that the photosensitive chip can receive enough light to improve the imaging quality. Of course, this design of FIG. 1 is not unique, and in other examples, the second reflective element 30 may be replaced by two separate reflect mirrors. At this time, the light is specularly reflected, and a process after the light is emitted from the lens is mirror-air-mirror-air. Since the light does not need to pass through a thicker prism, this design can also reduce the loss of light to a certain extent.

Figure 4:
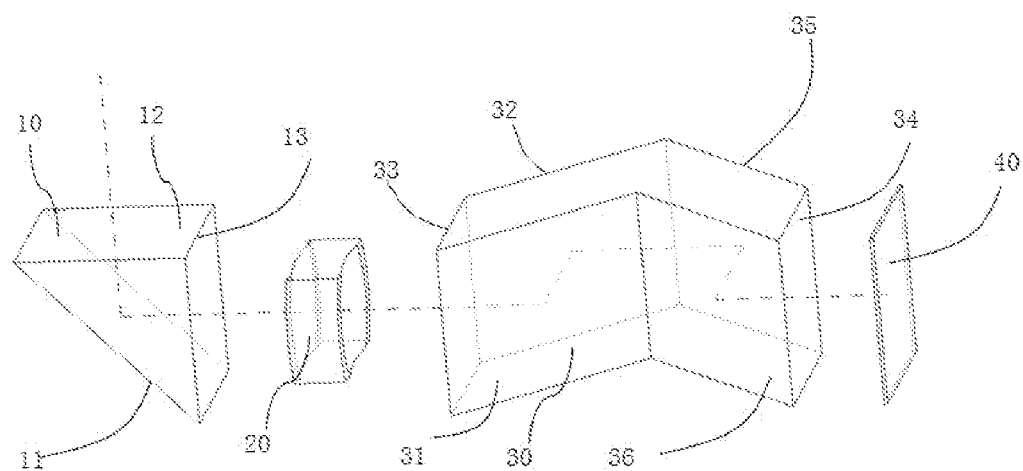
FIG. 4 shows a schematic perspective view of an optical path and optical elements of a periscopic camera module in another example of the present application.
Figure 5:
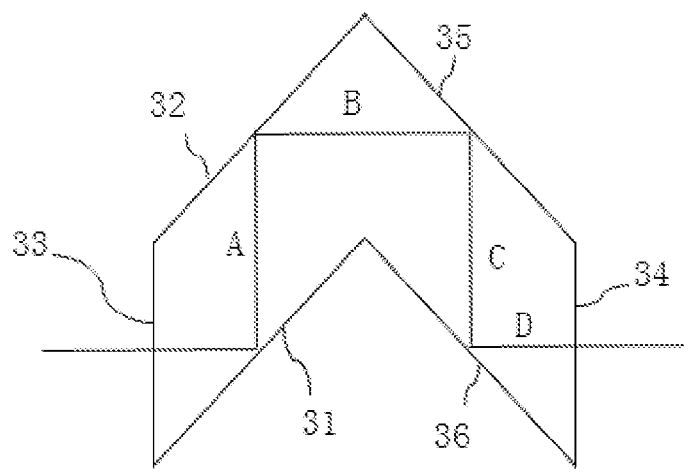
FIG. 5 shows a schematic diagram of an internal optical path of a prism of which a transverse cross-section is in an inverted "V" shape in another example of the present application.

Further, FIG. 4 shows a schematic perspective view of an optical path and optical elements of a periscopic camera module in another example of the present application. Referring to FIG. 4, in the present example, the second reflective element 30 adopts a prism of anisotropic shape, and the prism has two groups of second reflective surfaces, wherein each group has the two second reflective surfaces, and the two second reflective surfaces are parallel to each other. Also, the two groups of the second reflective surfaces are provided in an inverted "V" shape. The second reflective surfaces are all constituted by side surfaces of the prism, and the two end faces of the prism respectively constitute the incident surface 33 and the exit surface 34 of the second reflective element 30. More specifically, referring to FIG. 4, the two second reflective elements 31 and 32 constitute a first group, the other two second reflective elements 35 and 36 constitute a second group, and the first and the second groups together constitute the inverted "V" shape. Further, in this example, a transverse cross-section of the prism constituting the second reflective element 30 is in the inverted "V" shape. FIG. 5 shows a schematic diagram of an internal light path of a prism with the transverse cross section in the inverted "V" shape according to another example of the present application. Referring to FIG. 4 and FIG. 5, in this example, the light passes through and is reflected by the reflective surface 11 on the first reflective element 10, turns 90 degrees to reach the optical lens 20 (which contains at least three lenses), and then passes through the optical lens 20, after reaching the second reflective element 30 and being reflected by the second reflective surface 31, the light turns 90 degrees laterally to reach a second reflective surface 32, then turns 90 degrees laterally to a third second reflective surface 35, and then turns 90 degrees to reach a fourth second reflective surface 36, finally turns laterally by 90 degrees, and finally reaches the photosensitive chip. In this example, the first reflective element 10 and the second reflective element 30 are both prisms. However, it should be understood that in other examples of the present application, the first reflective element 10 and the second reflective element 30 may both be a reflect mirror, or a combination of a reflect mirror and a prism. Further, in this example, the incident direction of the incident light entering the first reflective element 10 is parallel to the photosensitive surface of the photosensitive chip 40.

Further, referring to FIG. 5, the light becomes the imageable light beam after passing through the optical lens, and after the imageable light beam is incident on the second reflective element 30, it undergoes four lateral turnings A, B, C, and D, wherein lengths of the turnings A and C contributes to reducing the overall length of the telephoto periscopic module, that is, the length by which the overall length of the telephoto periscopic module can be reduced is close to the sum of the lengths of the turnings A and C. Therefore, a solution of this example can significantly reduce the overall length of the periscopic module, thereby making the structure of the camera module compact. Moreover, in this example, four second reflective surfaces 31, 32, 35, and 36 are integrated on the same second reflective element 30, which not only reduces the number of reflective elements and reduces the assembly difficulty, but also avoids an increase in volume caused by multiple reflective elements. Furthermore, the solution of this example can also reduce redundant incident surfaces and exit surfaces, thereby reducing the loss of light in the process of prism-air-prism.

Further, still referring to FIG. 4, in one example of the present application, the second reflective element may be an axisymmetric shape. In this way, optical processes of the light experienced the two lateral turnings A and C in the second reflective element 30 are as equal as possible, so that light emitted from the second reflective element 30 can be overlapped with light incident on the second reflective element as much as possible, so that the center of the exit surface 13 of the first reflective element 10, the center of the optical lens 20, the center of the incident surface 33 of the second reflective element 30, the center of the exit surface 34 of the second reflective element 30 and the center of an imaging plane of the photosensitive chip 40 is kept on the same straight line as much as possible, that is, the concentricity of all components is increased. By increasing the concentricity of all components, it can help improve imaging quality. Of course, in other examples of the present application, the centers of the above-mentioned components may not be required to be on the same straight line, which can reduce requirements for assembly accuracy, which can be applied to telephoto periscopic camera modules that do not require high imaging quality.

Further, still referring to FIG. 4, the telephoto periscopic module with the inverted "V"-shaped prism provided in this example can have an effective focal length greater than or equal to 18 mm, or can have a field angle of less than or equal to 20 degrees. Preferably, the telephoto periscopic module can have an effective focal length greater than or equal to 25 mm, or it can have a field angle of less than or equal to 15 degrees. It should be noted that, as a comparison, for a conventional periscopic camera module based on a linear design (as shown in FIG. 3), the overall length of the periscopic camera module with an effective focal length greater than or equal to 18 mm will be very large (for example, more than 25 mm, even more than 30 mm). In the solution shown in FIG. 4, the overall length of the periscopic camera module can be significantly reduced.

Further, based on the design of the second reflective element 30 in FIG. 4, a series of modified examples can also be derived. In the example of FIG. 4, the special-shaped prism used as the second reflective element 30 has two groups of the second reflective surfaces, a total of four second reflective surfaces, while in other modified examples, the special-shaped prism used as the second reflective element 30 may have more groups of the second reflective surface. These second reflective surfaces may be cyclically arranged with the two groups of the reflective surfaces shown in FIG. 4 as basic units. That is, a transverse cross section of the special-shaped prism can be a shape formed by splicing a plurality of "V" shapes or inverted "V" shapes (for example, a "W" shape or an inverted "W" shape). In other words, in a modified example, the second reflective element 30 may include multiple groups of the second reflective surfaces, wherein each group has two of the second reflective surfaces and the two second reflective surfaces are parallel to each other, and any two adjacent groups of the second reflective surfaces are arranged in a "V" shape or the inverted "V" shape. The second reflective element is a single prism, a side surface of the prism constitutes the second reflective surface, and the two end faces of the prism constitute the incident surface and the exit surface of the second reflective element respectively. The transverse cross section of the prism is in the "V" shape or the inverted "V" shape, or a shape formed by splicing a plurality of "V" shapes and/or a plurality of inverted "V" shapes.

Figure 6:
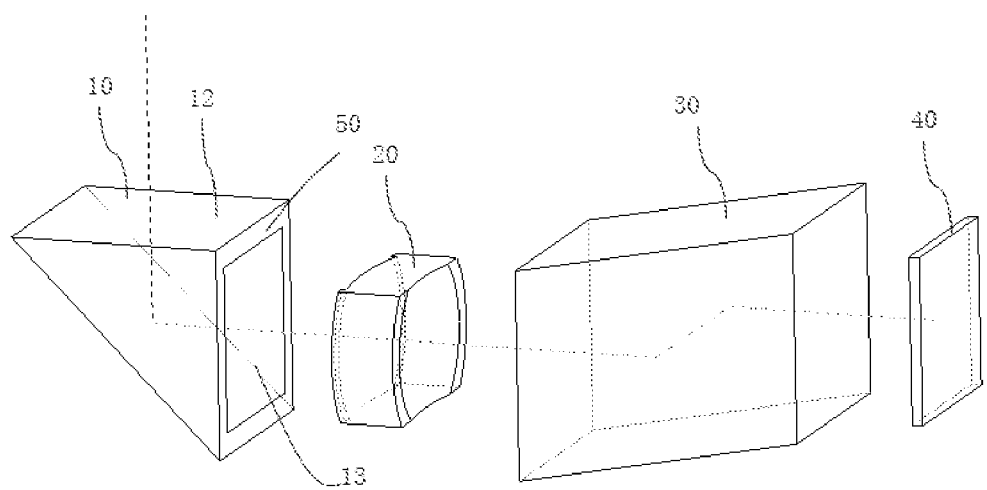
FIG. 6 shows a schematic perspective view of an optical path and optical elements of a periscopic camera module having a light-blocking structure according to an example of the present application.
Figure 7:
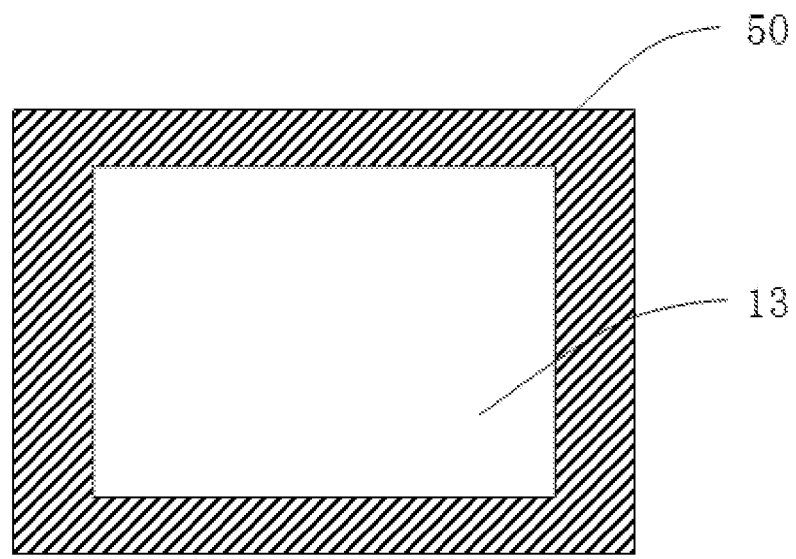
FIG. 7 shows a schematic diagram of the positional relationship between a light-blocking structure 50 and a surface of the reflective element where it is located.

Further, FIG. 6 shows a schematic perspective view of an optical path and optical elements of a periscopic camera module having a light-blocking structure according to an example of the present application. From the perspective of FIG. 6, the exit surface 13 of the first reflective element 10 can be clearly shown. Referring to FIG. 6, in this example, a light-blocking structure 50 may be provided at an edge region of the exit surface 13. The light-blocking structure 50 has the function of absorbing light (or inhibiting light reflection). For example, the light-blocking structure 50 may have a darker color (e.g., black, brown, etc.). In terms of specific implementation, the light-blocking structure can be a dark silk-screened film, a dark coating film, a dark film coated on the surface of the reflective element, a dark film printed with ink on the surface of the reflective element, and the light-blocking structure can also be injection molding shaped light-blocking member, the light-blocking member can be directly formed on the surface of the reflective element, or an annular groove can be provided in an edge region of the surface of the reflective element and then a pre-shaped light-blocking member can be embedded in the annular groove. FIG. 7 shows a schematic diagram of the positional relationship between the light-blocking structure 50 and a surface of a reflective element on which the light-blocking structure 50 is located. It can be seen that the light-blocking structure 50 is provided at an edge region of the surface of the reflective element on which the light-blocking structure 50 is located, so that the central region of the surface of the reflective element can form a light-passing hole. In this example, structures and positional relationships of other elements of the periscopic camera module are consistent with the example shown in FIG. 1, and will not be repeated here.

Figure 8:
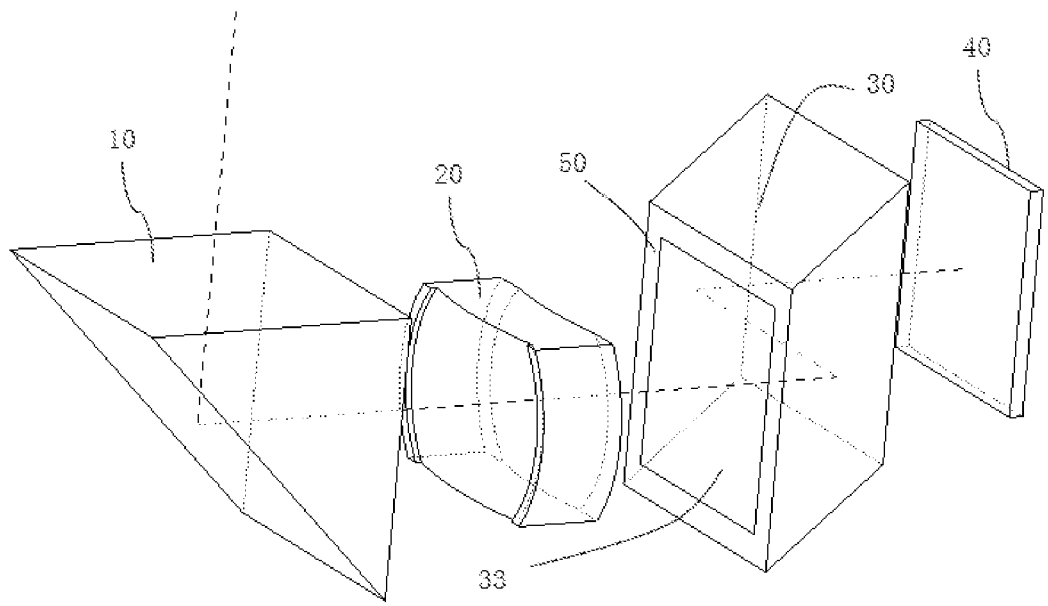
FIG. 8 shows a schematic perspective view of an optical path and optical elements of a periscopic camera module having a light-blocking structure according to another example of the present application.

Further, FIG. 8 shows a schematic perspective view of an optical path and optical elements of a periscopic camera module with a light-blocking structure according to another example of the present application. From the perspective of FIG. 8, the incident surface 33 of the second reflective element 30 can be clearly shown. Referring to FIG. 8, in this example, the light-blocking structure 50 may be provided at an edge region of the incident surface 33. The specific implementation of the light-blocking structure 50 and the positional relationship between the light-blocking structure 50 and the surface of the reflective element on which the light-blocking structure 50 is located can refer to the previous example, which will not be repeated here. In addition, in this example, the structures and positional relationships of other elements of the periscopic camera module are the same as those in the example shown in FIG. 1, and will not be repeated here.

Figure 9:
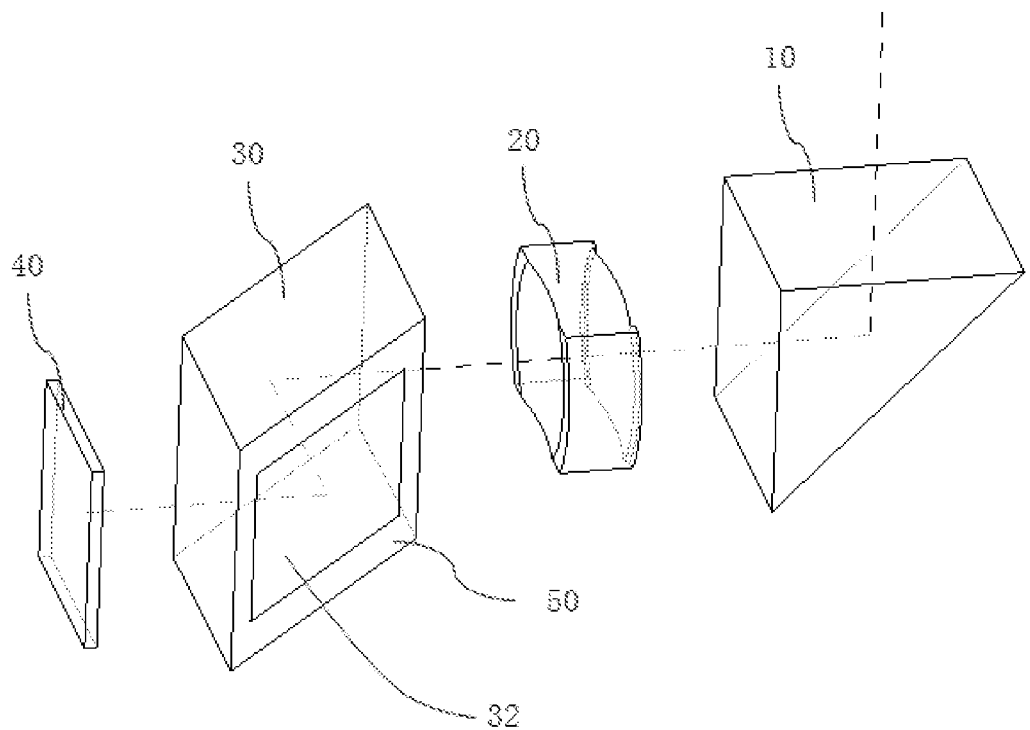
FIG. 9 shows a schematic perspective view of an optical path and optical elements of a periscopic camera module having a light-blocking structure according to another example of the present application.

Further, FIG. 9 shows a schematic perspective view of an optical path and optical elements of a periscopic camera module having a light-blocking structure according to another example of the present application. From the perspective of FIG. 9, the second reflective surface 32 of the second reflective element 30 can be clearly shown. Referring to FIG. 9, in this example, the light-blocking structure 50 may be provided at an edge region of the second reflective surface 32. The specific implementation of the light-blocking structure 50 and the positional relationship between the light-blocking structure 50 and the surface of the reflective element on which the light-blocking structure 50 is located can refer to the previous examples, which will not be repeated here. In addition, in this example, the structures and positional relationships of other elements of the periscopic camera module are the same as those in the example shown in FIG. 1, and will not be repeated here.

In the above three examples, the periscopic camera module can suppress the stray light caused by a turning of an optical path, thereby improving the imaging quality. In addition, in the periscopic camera modules of the above three examples, no additional independent light-shielding elements are required, which helps to reduce volume of a module. It should be noted that the above three examples are not exhaustive. In other examples of the present application, a modified arrangement solution of the light-blocking structure may also be adopted. For example, the reflective surface (the reflective surface may include the first reflective surface or the second reflective surface), the incident surface and the exit surface can all be regarded as optical surfaces through which the light path passes. For all the optical surfaces of the first reflective element and the second reflective element, wherein, at least one optical surface has a light-blocking structure, and the light-blocking structure is provided at an edge region of the at least one optical surface, that is, to a certain extent, the stray light caused by the turning of the optical path is suppressed, thereby improving the imaging quality and reducing the volume of the module.

Figure 10:
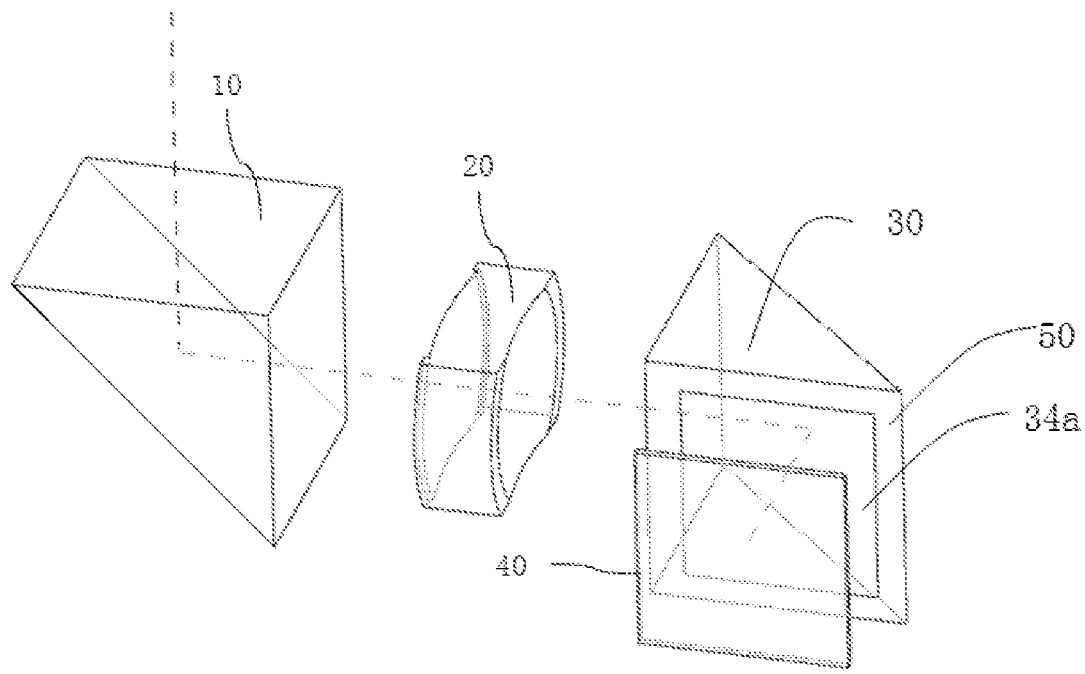
FIG. 10 shows a schematic perspective view of an optical path and optical elements of a periscopic camera module having a light-blocking structure according to a modified example of the present application.

In the examples shown in FIGS. 6, 8, and 9, the second reflective element 30 adopts a prism of which a transverse cross section is a parallelogram. It should be noted that the second reflective element 30 of the present application is not limited to such a prism. For example, in a modified example, the second reflective element 30 may be a triangular prism. FIG. 10 shows a schematic perspective view of an optical path and optical elements of a periscopic camera module having the light-blocking structure according to a modified example of the present application. Referring to FIG. 10, in this example, the second reflective element 30 adopts a triangular prism, and the triangular prism has an incident surface, an exit surface and a second reflective surface, wherein the second reflective surface is an inclined surface of the triangular prism. The light-blocking structure 50 is provided on an exit surface 34a of the second reflective element 30. The light-blocking structure 50 is provided on an edge region of the exit surface 34a. In this example, the optical path is only turned laterally once in the second reflective element 30, but the optical path can still play the role of folding the optical path and reducing the length of the camera module.

Figure 11:
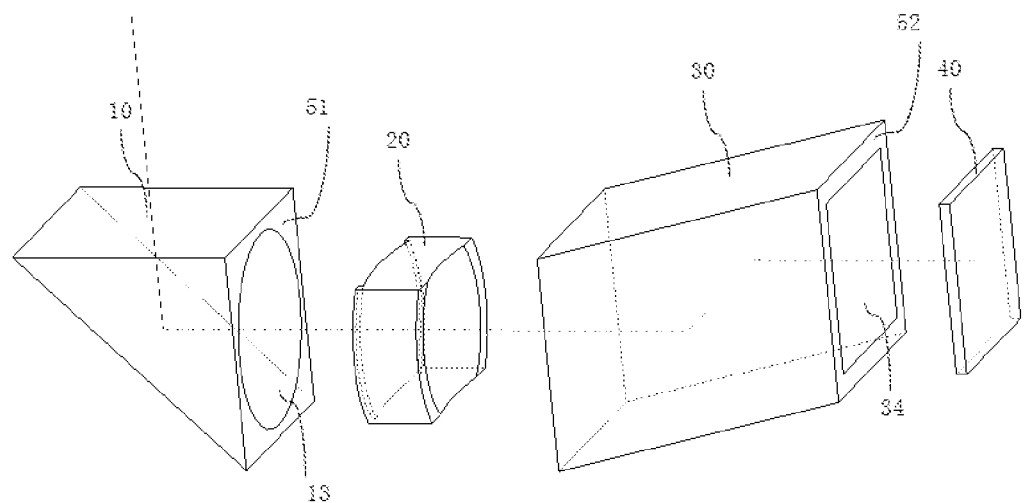
FIG. 11 shows a schematic perspective view of an optical path and optical elements of a periscopic camera module having multiple light-blocking structures according to an example of the present application.

Further, FIG. 11 shows a schematic perspective view of an optical path and optical elements of a periscopic camera module having multiple light-blocking structures according to an example of the present application. Referring to FIG. 11, in this example, a plurality of the light-blocking structures may be provided on the optical path of the periscopic camera module. In addition, a light-passing hole is formed in a center of the light-blocking structure, and the shape of the light-passing hole may be circular, oval or rectangular. In this example, the light-blocking structure includes a first light-blocking structure 51 and a second light-blocking structure 52. The first light-blocking structure 51 has a circular or oval light-passing hole, and the second light-blocking structure 52 has a rectangular light-passing hole. The first light-blocking structure 51 is provided on the exit surface 13 of the first reflective element 10, and the second light-blocking structure 52 is provided on the exit surface 34 of the second reflective element 30. The telephoto camera module has the characteristics of long focal length, long total optical length, long optical path, and many turning times of the light path, which leads to the travel distance of light traveling inside the camera module compared to the ordinary periscopic module (light turns once) will be relatively long, and the optical path of this example is relatively complicated (after multiple turnings), and the light will be reflected by structural parts (such as an edge of the lens barrel, the edge of the reflective element, an edge of the bracket) on the way during the shuttle process, resulting in generation of stray light. In this example, by arranging light-shielding structures on multiple optical surfaces, the risk of introducing stray light caused by long optical paths and multiple turnings of the optical paths can be suppressed or avoided, thereby ensuring the imaging quality of the module. Further, in this example, light-blocking structures having light-passing holes of different shapes are arranged on different optical surfaces (the optical surfaces include the incident surface, the reflective surface, and the exit surface), so that the light receiving amount at different regions of the photosensitive chip is approximately uniform, thereby improving imaging quality. Specifically, a clear aperture of the lens of the optical lens is usually circular, or is cut from a circle (after cutting, at least a part of an outline of the clear aperture of the lens is in an arc shape). Therefore, arranging a light-shielding structure having a circular or oval light-passing hole at a front or rear of the optical lens is conductive to matching with the optical lens and avoids the problem of uneven light receiving amount between the edge region and the central region of the captured image; in addition, because an imaging shape of the optical lens is roughly circular, the shape of the light-passing hole matches the imaging shape, so that the imaging light can pass through the reflective element, while some stray light (such as stray light formed by light reflected by the internal structure of the camera module) is blocked by the light-blocking structure outside the light-passing hole, so as to prevent these stray light from affecting the imaging quality.

Correspondingly, since the photosensitive surface of the photosensitive chip is usually rectangular, arranging the second light-blocking structure with rectangular light-passing holes on the optical surface close to the photosensitive chip also helps to make different regions of the photosensitive chip (such as the edge region and the central region)) is approximately uniform in light receiving amount, thereby improving imaging quality. On the other hand, a shape of the rectangular light-passing hole matches the photosensitive region of the photosensitive chip, and the rectangular light-passing hole can limit the imaging light to a rectangle and land on the photosensitive region of the photosensitive chip as much as possible. If the light-blocking structure is not provided or the shape of the light-blocking structure does not match, the light outside the rectangular light-passing hole may fall outside the photosensitive region of the photosensitive chip and be reflected by the leads, electronic elements or other internal structures of the module, thereby forming stray light. These stray lights may affect the imaging quality, and the arrangement of the second light-blocking structure having the rectangular light-passing holes can well suppress or avoid this situation.

Figure 12:
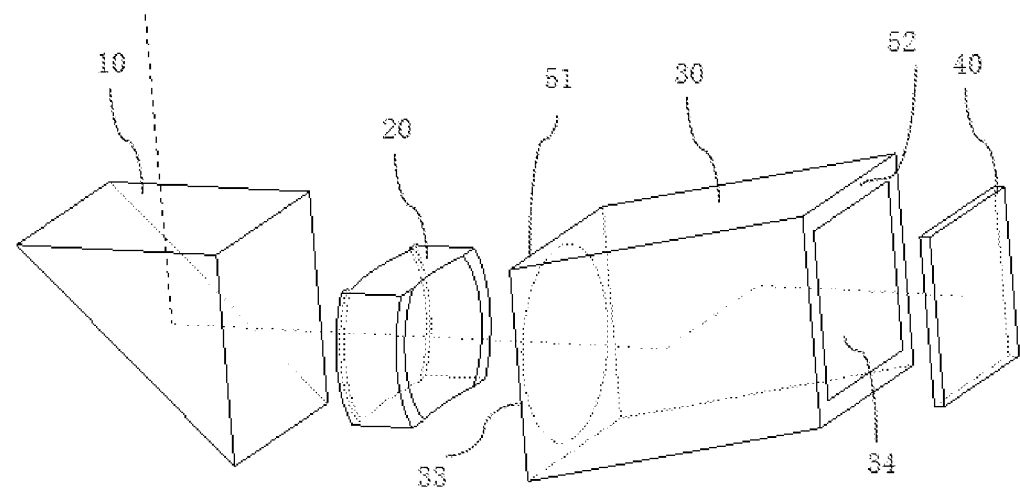
FIG. 12 shows a perspective view of an optical path and optical elements of a periscopic camera module having multiple light-blocking structures according to another example of the present application.

Further, FIG. 12 shows a schematic perspective view of an optical path and optical elements of a periscopic camera module having multiple light-blocking structures according to another example of the present application. Referring to FIG. 12, in this example, a plurality of the light-blocking structures may be provided on the optical path of the periscopic camera module. The light-blocking structure can include a first light-blocking structure 51 and a second light-blocking structure 52. The first light-blocking structure 51 has a circular or oval light-passing hole, and the second light-blocking structure 52 has a rectangular light-passing hole. In this example, the first light-blocking structure 51 is provided on the incident surface 33 of the second reflective element 30, and the second light-blocking structure 52 is provided on the exit surface 34 of the second reflective element 30.

Figure 13:
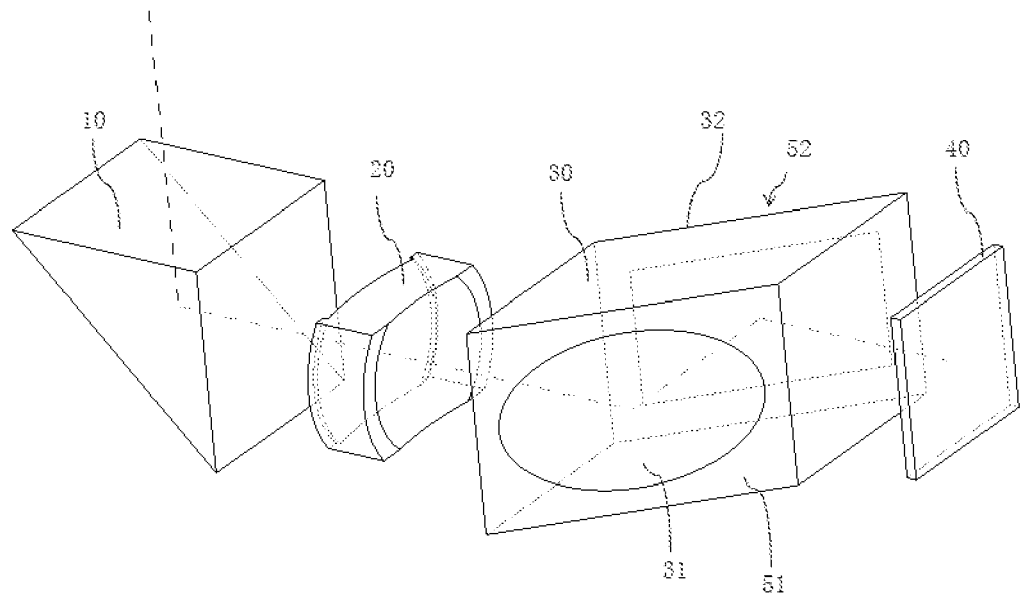
FIG. 13 shows a schematic perspective view of an optical path and optical elements of a periscopic camera module having multiple light-blocking structures according to yet another example of the present application.

Further, FIG. 13 shows a schematic perspective view of an optical path and optical elements of a periscopic camera module having multiple light-blocking structures according to yet another example of the present application. Referring to FIG. 13, in this example, a plurality of the light-blocking structures may be provided on the optical path of the periscopic camera module. The light-blocking structure may include a first light-blocking structure 51 and a second light-blocking structure 52. The first light-blocking structure 51 has a circular or oval light-passing hole, and the second light-blocking structure 52 has a rectangular light-passing hole. In this example, the second reflective element 30 has two second reflective surfaces 31 and 32. The first light-blocking structure 51 is provided on a first second reflective surface 31 of the second reflective element 30, and the second light-blocking structure 52 is provided on a second second reflective surface 32. In this example, the light-passing hole of the first light-blocking structure 51 is oval, because the second reflective surface is a 45-degree reflective surface, and the light beam with a circular cross-section projected onto the 45-degree reflective surface will have an oval shape, therefore, in this case, the first light-blocking structure 51 with the light-passing hole in the shape of oval can have a better effect.

Figure 14:
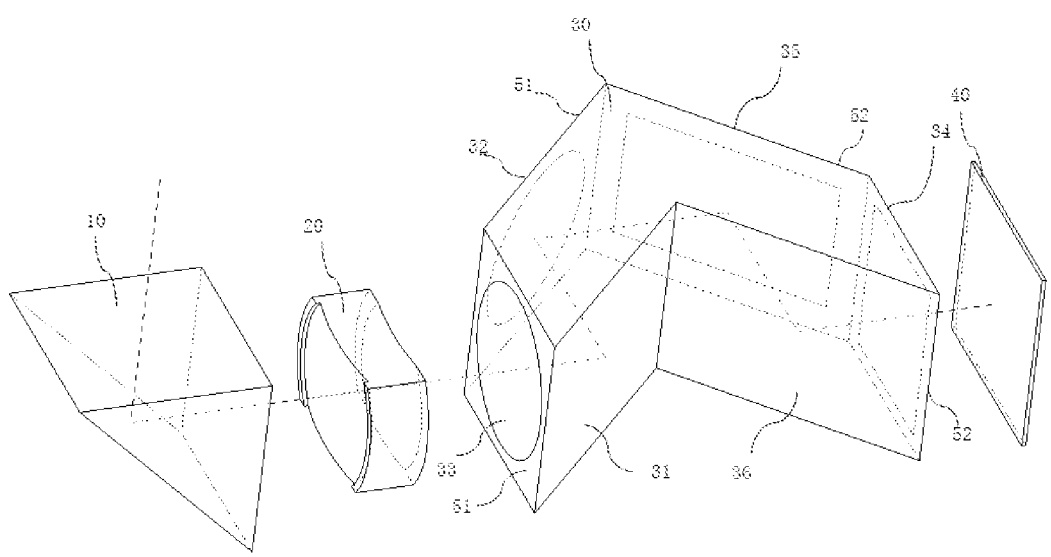
FIG. 14 shows a perspective view of an optical path and optical elements of a periscopic camera module having multiple light-blocking structures according to still another example of the present application.

Further, FIG. 14 shows a schematic perspective view of an optical path and optical elements of a periscopic camera module having multiple light-blocking structures according to still another example of the present application. In this example, the second reflective element 30 adopts a special-shaped prism as shown in FIG. 4. The difference from the example of FIG. 4 is that, in this example, a plurality of the light-blocking structures can be provided on the optical path of the periscopic camera module. The light-blocking structure may include a first light-blocking structure 51 and a second light-blocking structure 52. The first light-blocking structure 51 has a circular or oval light-passing hole, and the second light-blocking structure 52 has a rectangular light-passing hole. In this example, the second reflective element 30 has four second reflective surfaces. The first light-blocking structure 51 is provided on the incident surface 33 and the second one of the second reflective surfaces 32 of the second reflective element 30, and the second light-blocking structure 52 is provided on a third one of the second reflective surfaces 35 and the exit surface 34 (the positions of the incident surface 33, the second one of the second reflective surfaces 32, the third one of the second reflective surfaces 35 and the exit surface 34 of the second reflective element 30 may also refer to FIG. 4).

In addition to the above-mentioned examples, the present application may also have several modified examples. In these examples, the first light-blocking structure may be provided on one or more optical surfaces close to an object side, and the second light-blocking structure may be provided on one or more optical surfaces near the image side, that is, compared with the first light-blocking structure, the second light-blocking structure is provided on the side close to the image side.

Figure 15:
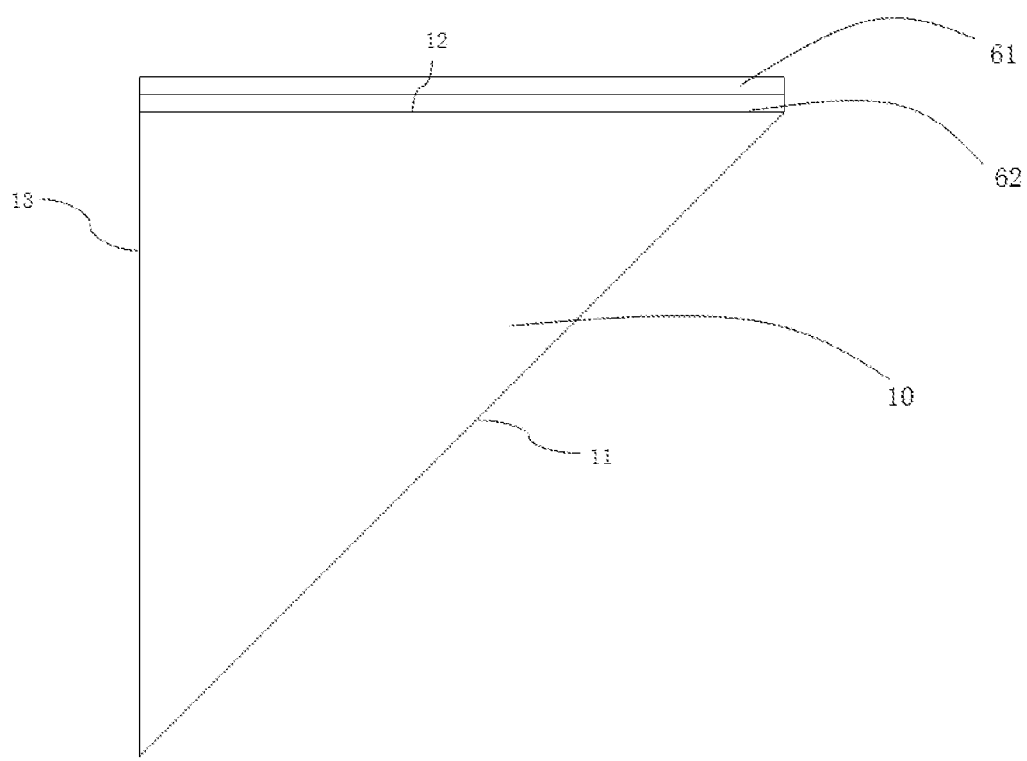
FIG. 15 shows a schematic longitudinal cross-sectional view of a first reflective element in an example of the present application.
Figure 16:
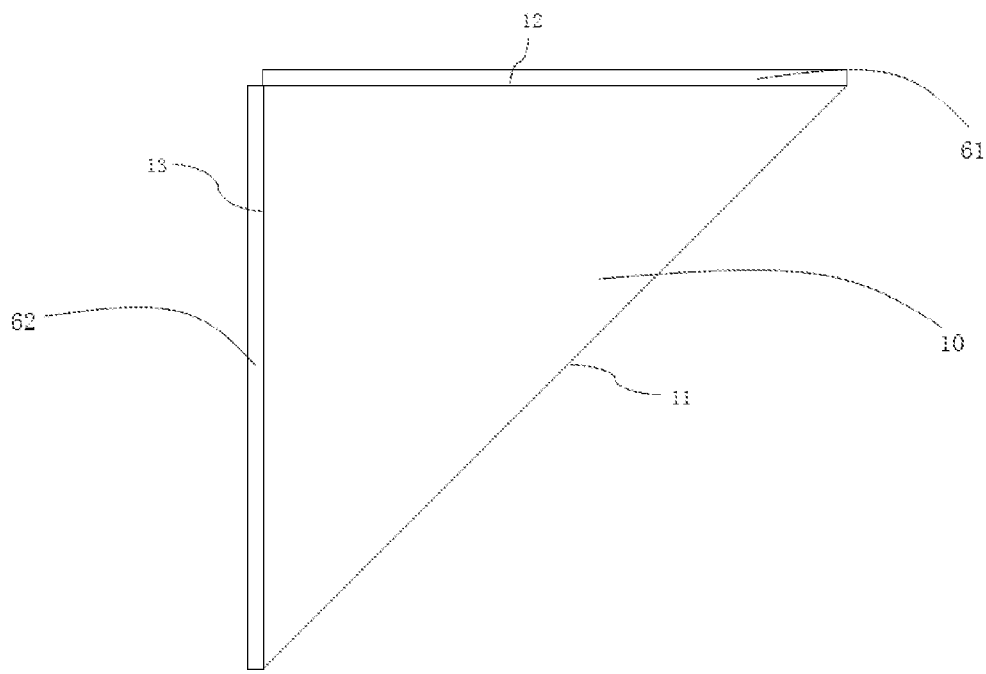
FIG. 16 shows a schematic longitudinal cross-sectional view of a first reflective element in another example of the present application.

Further, FIG. 15 shows a schematic longitudinal cross-sectional view of a first reflective element in an example of the present application. Referring to FIG. 15, in this example, the first reflective element 10 is a triangular prism, which includes an incident surface 12, an exit surface 13 and a first reflective surface 11, wherein the incident surface 12 is provided with a visible light anti-reflective coating film 61 and the color filter film 62, the color filter film 62 may be an infrared filter film. The color filter film 62 of this example can replace an independent color filter in the conventional camera module, thereby helping to reduce the volume of the camera module. In this example, both the visible light anti-reflective coating film 61 and the color filter film 62 are attached to the incident surface 12, but this solution is not unique. For example, FIG. 16 shows a schematic diagram of longitudinal cross-sectional view of a first reflective element in another example of the present application. Referring to FIG. 16, in this example, the visible light anti-reflective coating film 61 is provided on the incident surface 12 of the first reflective element 10, and the color filter film 62 is provided on the exit surface 13 of the first reflective element 10. That is to say, the visible light anti-reflective coating film 61 and the color filter film 62 may be provided on different optical surfaces in the camera module.

Further, in another example of the present application, the visible light anti-reflective coating film 61 and the color filter film 62 may be provided on the second reflective element 30. Specifically, for example, the visible light anti-reflective coating film 61 and the color filter film 62 can both be provided on the incident surface 33 of the second reflective element 30, or both can be provided on the exit surface 34 of the second reflective element 30, the visible light anti-reflective coating film 61 and the color filter film 62 may also be provided on the incident surface 33 and the exit surface 34 of the second reflective element 30, respectively. In yet another example, the visible light anti-reflective coating film 61 and the color filter film 62 may also be provided on different optical surfaces of the first reflective element 10 and the second reflective element 30, respectively.

Further, in still another example of the present application, in the periscopic camera module, at least one of four optical surfaces of the incident surface 12 and the exit surface 13 of the first reflective element 10 and the incident surface 33 and the exit surface 34 of the second reflective element 30 has the visible light anti-reflective coating film 61, and at least one of the four optical surfaces has the color filter film 62. The visible light anti-reflective coating film 61 and the color filter film 62 may be on the same optical surface, or may be provided on different optical surfaces respectively.

Further, in still another example of the present application, in the periscopic camera module, the first reflective element 10 and/or the second reflective element 30 may be a reflect mirror, and the reflect mirror has a reflective surface, which can be realized based on the principle of specular reflection. The light-blocking structure may be provided on an edge region of the reflective surface. Further, on the reflective surface, the visible light anti-reflective coating film and/or the color filter film may also be provided in the light-passing holes of the light-blocking structure.

Further, in another example of the present application, in the periscopic camera module, the first reflective element 10 and/or the second reflective element 30 may be a prism. The light-blocking structure may be provided on an edge region of the reflective surface of the prism. Further, on the reflective surface, the visible light anti-reflective coating film and/or the color filter film may also be provided in the light-passing holes of the light-blocking structure.

Further, in an example of the present application, in the periscopic camera module, the first reflective element may have a first driver (or a first actuator), and the first driver may drive the first reflective element rotates or moves linearly (i.e., translates) to realize the optical image stabilization function of the periscopic camera module.

Further, in an example of the present application, in the periscopic camera module, the optical lens may have a second driver (or referred to as a second actuator), and the second driver may drive the lens to move, so that the lens can have optical image stabilization function.

Further, in an example of the present application, in the periscopic camera module, the optical lens may have a second driver, and the second driver may drive the lens to move, so as to change the distance between the lens and the photosensitive chip, so that the camera module can have the function of auto-focusing.

Further, in an example of the present application, in the periscopic camera module, the optical lens can be fixed on a bottom substrate, so that the distance between the lens and the photosensitive chip remains unchanged, that is, the periscopic camera module can be a fixed-focus module, which is beneficial to simplify the structure of the module and reduce the volume of the module.

It should be noted that in this application, the edge region of the optical surface of the prism is usually an optically invalid region, that is, the edge region of the optical surface may not pass light. At this time, in order to save volume or other purposes, part of the edge region of the prism can be cut (such as one edge or multiple edges). For example, in some examples of the present application, the first reflective element may be a deformation of a triangular prism, such as a prism after cutting at least one edge of the triangular prism. For the convenience of description, a prism obtained by cutting one or more edges of a triangular prism at the edge region is still regarded as a triangular prism. Similarly, when prisms are used for the second reflective element, the edges in the edge regions thereof can also be cut. For example, one or more edges of a prism of which a transverse cross-section is a parallelogram can also be cut. For the convenience of description, the cut prism is still regarded as a prism of which a transverse cross-section is a parallelogram.

In addition, in addition to the effective focal length, a concept of equivalent focal length is often used in the market. A size of the equivalent focal length is not only affected by an actual effective focal length of the optical lens, but also related to a size of the photosensitive chip. In a field of smartphones, a diagonal size of a common photosensitive chip (referring to a diagonal size of the actual photosensitive region that can receive the imageable light beam) is generally 4.5 mm-6 mm. Therefore, in the field of smartphones, in case that the effective focal length of the optical lens is 15 mm, the equivalent focal length can exceed 140 mm, and in case that the effective focal length of the optical lens is 18 mm, the equivalent focal length can exceed 170 mm, and in case that the effective focal length of the optical lens is 25 mm, the equivalent focal length can exceed 240 mm. It can be seen that, by using the periscopic camera module of the present application, excellent telephoto capability can be obtained.

Further, according to an example of the present application, an electronic device based on a periscopic camera module is also provided. The electronic device may be, for example, a smartphone or a tablet. The electronic device may include the periscopic camera module described in any of the foregoing examples, wherein an incident direction of incident light of a first reflective element of the periscopic camera module is consistent with a thickness direction of the electronic device. The present example can contribute to realizing a telephoto function (or a high-power zoom function) in an electronic device having a small thickness.

Further, in a series of modified examples of the present application, a variety of periscopic camera modules based on modified special-shaped prisms are also provided. The following descriptions are respectively made with reference to a plurality of examples.

Figure 17:
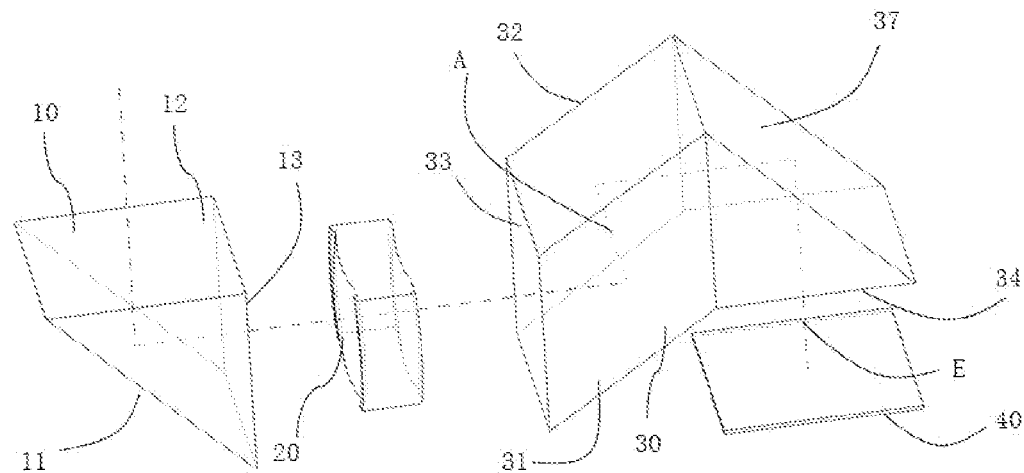
FIG. 17 shows a schematic perspective view of an optical path and optical elements of a periscopic camera module in yet another example of the present application.

FIG. 17 shows a schematic perspective view of an optical path and optical elements of a periscopic camera module in yet another example of the present application. Referring to FIG. 17, in this example, a second reflective element 30 is implemented by a special-shaped prism. a shape of the special-shaped prism is composed of a prism body of which a transverse cross section is a parallelogram and a triangular prism body. In terms of specific implementation, the second reflective element 30 in this example may be integrally formed, or may be formed by splicing (e.g., bonding) two single prisms, or may be obtained by cold processing such as cutting or grinding optical glass, wherein, during the cold processing, processes such as water rinsing can be combined. Wherein, the prism body of which the transverse cross section is a parallelogram may be the same as a shape of the second reflective element in FIG. 1. Two mutually parallel side surfaces of the parallelogram prism body can constitute two second reflective surfaces 31 and 32, and an inclined surfaces of the triangular prism body can form a third reflective surface 37. In an optical path, the third reflective surface 37 is located at a rear end of the two second reflective surfaces 31 and 32. The third reflective surface 37 can receive an imageable light beams reflected by the two second reflective surfaces 31 and 32 and turn them longitudinally. After the longitudinal turning, an outgoing direction of the imageable light beam is consistent with an original incident light of the periscopic camera module. In this way, an incident direction of the incident light entering the first reflective element 10 may be perpendicular to the photosensitive surface of the photosensitive chip 40. In this example, the second reflective element 30 is a single optical element having the second reflective surfaces 31 and 32 and the third reflective surface 37. A telephoto periscopic module with the special-shaped prism provided in this example can have an effective focal length greater than or equal to 18 mm, or it can have a field angle of less than or equal to 20 degrees. Preferably, the telephoto periscopic module can have an effective focal length greater than or equal to 25 mm, or it can have a field angle of less than or equal to 15 degrees. In this example, after entering the second reflective element 30, the imageable light beam is reflected by a first second reflective surface 31 to form a lateral turning A, and then reflected by a second second reflective surface 32 to form a lateral turning B, and finally reflected by the third reflective surface 37 to form a longitudinal turning E, and finally enters the photosensitive chip. This optical path design can reduce a length of the camera module, and the reduction amount is approximately a sum of lengths of the lateral turning A and the longitudinal turning E. It should be noted that, in a modified example, number of the second reflective elements may also be two or more. The second reflective surface and the third reflective surface may be located on different second reflective elements, respectively.

Figure 18:
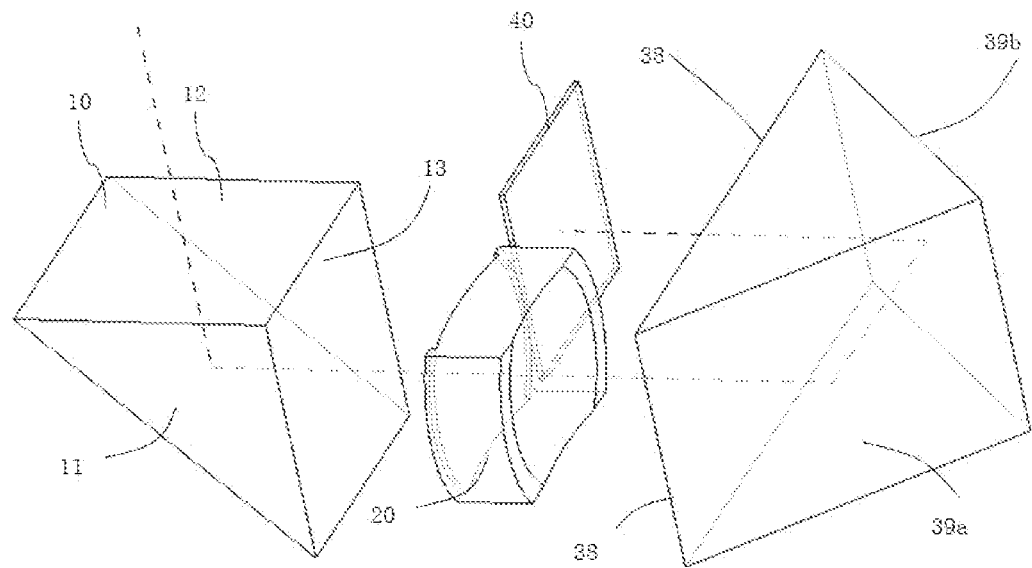
FIG. 18 shows a schematic perspective view of an optical path and optical elements of a periscopic camera module in still another example of the present application.
Figure 19:
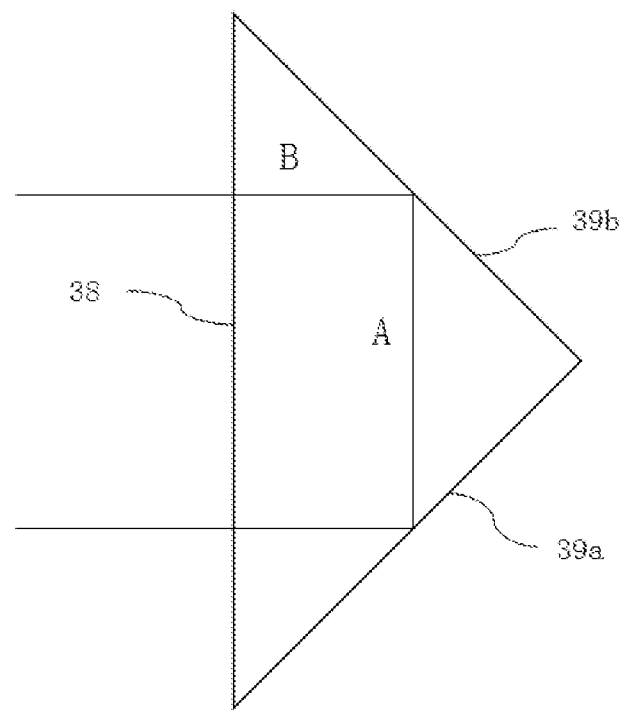
FIG. 19 shows a schematic diagram of an internal light path of a second reflective element of the periscopic camera module in still another example of the present application.

Further, FIG. 18 shows a three-dimensional schematic diagram of an optical path and optical elements of a periscopic camera module in still another example of the present application. FIG. 19 shows a schematic diagram of an internal light path of the second reflective element of the periscopic camera module in still another example of the present application. Referring to FIGS. 18 and 19, in this example, the second reflective element 30 is a triangular prism, but different from the common triangular prism described above, in this example, the inclined surface 38 of the triangular prism is used as the incident surface and the exit surface, and two mutually perpendicular side surfaces serve as the two second reflective surfaces 39a and 39b, respectively. The two second reflective surfaces 39a, 39b can respectively turn the incident imageable light beam (the light beam from an optical lens 20) into the lateral turning A and the lateral turning B, so that a transmission direction 180 of the imageable light beam is turned back. In this way, the length of the periscopic camera module can be reduced, thereby making the structure of the camera module more compact.

Figure 20:
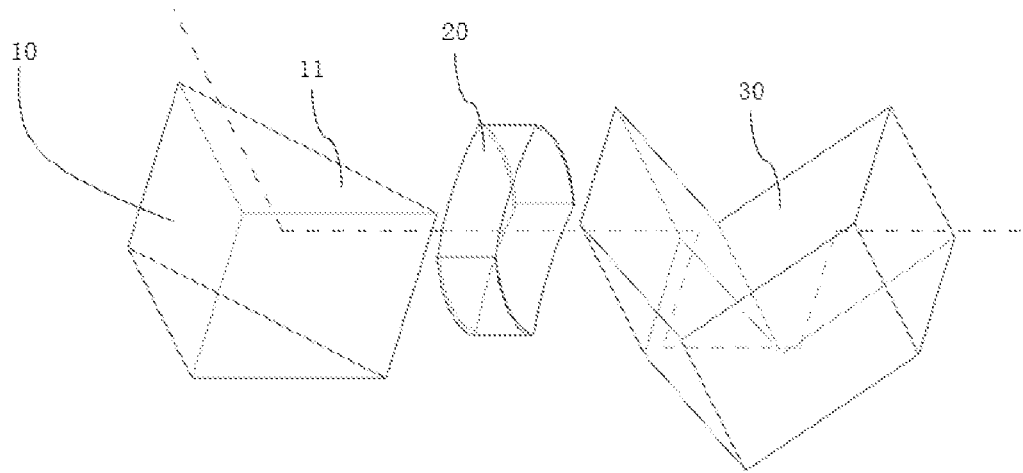
FIG. 20 shows a schematic perspective view of an optical path and optical elements of a periscopic camera module in still another example of the present application.

Further, FIG. 20 shows a three-dimensional schematic diagram of an optical path and optical elements of a periscopic camera module in still another example of the present application. In the present example, the first reflective element 10 is constituted by a reflect mirror. The reflect mirror is a 45-degree reflect mirror. In this example, the reflect mirror can be arranged on an inclined surface of a triangular prism body, but it should be noted that the triangular prism is not a triangular prism, the incident light is directly incident on the first reflective surface 11, and the incident light does not need to enter an interior of the triangular prism body. In this example, the second reflective element 30 adopts a special-shaped prism with a "V"-shaped structure, which has two groups of second reflective surface, i.e., a total of four second reflecting surfaces. It should be noted that the photosensitive chip 40 is not shown in FIG. 20. In this example, the incident direction of the incident light of the first reflective element 10 may be parallel to the photosensitive surface of the photosensitive chip 40.

Figure 21:
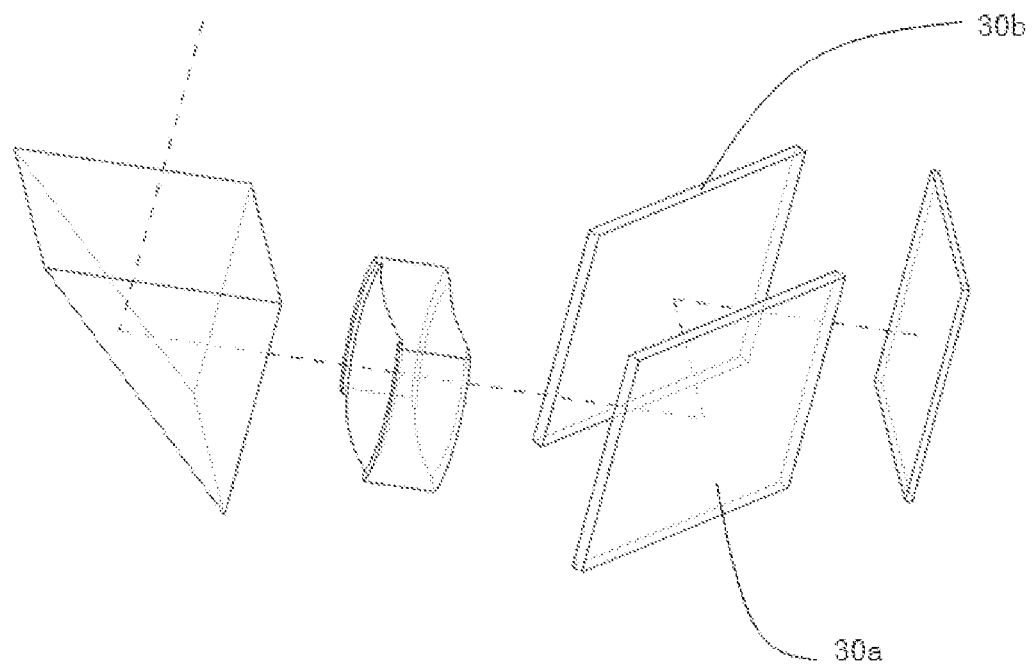
FIG. 21 shows a schematic perspective view of an optical path and optical elements of a periscopic camera module in still another example of the present application.

Further, FIG. 21 shows a three-dimensional schematic diagram of an optical path and optical elements of a periscopic camera module in yet another example of the present application. In this example, the second reflective element may include two second reflect mirrors 30a and 30b, each of the second reflect mirrors may have one of the second reflective surfaces, and the second reflect mirror may be a 45-degree reflect mirror. The two second reflect mirrors 30a, 30b may be parallel. The function of the second reflective surface may be the same as that of the second reflective surface in the example of FIG. 1, so as to reduce the length of the periscopic camera module.

Figure 22:
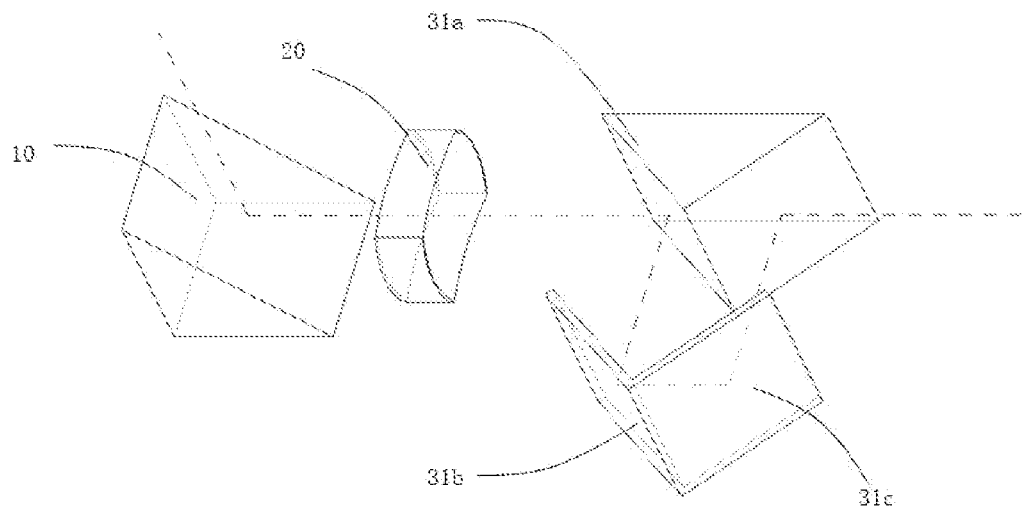
FIG. 22 shows a schematic perspective view of an optical path and optical elements of a periscopic camera module in still another example of the present application.

Further, FIG. 22 shows a three-dimensional schematic diagram of an optical path and optical elements of a periscopic camera module in still another example of the present application. In this example, the second reflective elements may all be implemented by reflect mirrors. Specifically, the reflect mirror may be a plane mirror or can be made into prism body shape, but the incident light does not enter a prism body, but is reflected on a surface of the prism body based on the principle of specular reflection. Referring to FIG. 22, the second reflective element includes a triangular prism body 31a and two plane mirrors 31b and 31c. Two mutually perpendicular side surfaces of the triangular prism body 31a form two reflective surfaces, and the two plane mirrors 31b and 31c form the other two reflective surfaces. Further, in a modified example, the second reflective element may also be formed by a mixture of the prisms and the reflect mirrors, and among the plurality of second reflective surfaces, a part of them may be located on the prism, and another part may be located on the reflect mirror.

Further, in an example of the present application, in the periscopic camera module, the first reflective element may have a first driver (or a first actuator), and the first driver may drive the first reflective element rotates or moves linearly (i.e., translates) to realize an optical image stabilization function of the periscopic camera module.

Further, in an example of the present application, in the periscopic camera module, the optical lens may have a second driver (or referred to as a second actuator), and the second driver may drive the lens to move, so that the lens can have the optical image stabilization function.

Further, in an example of the present application, in the periscopic camera module, the optical lens may have a second driver, and the second driver may drive the lens to move, so as to change the distance between the lens and the photosensitive chip, so that the camera module can have the function of auto-focusing.

Further, in an example of the present application, in the periscopic camera module, the optical lens can be fixed on the bottom substrate, so that a distance between the lens and the photosensitive chip remains unchanged, that is, the periscopic camera module can be a fixed-focus module, which is beneficial to simplify a structure of the module and reduce a volume of the module.

It should be noted that, in this application, the edge region of the optical surface of the prism is usually an optically invalid region, that is, the edge region of the optical surface may not pass light. At this time, in order to save volume or other purposes, part of the edge region of the prism can be cut (such as cutting an edge or edges). For example, in some examples of the present application, the first reflective element may be a variation of a triangular prism, such as a prism after cutting at least one edge of the triangular prism. For the convenience of description, a prism obtained by cutting one or more edges of a triangular prism at the edge region is still regarded as a triangular prism. Similarly, when prisms are used for the second reflective element, the prisms in the edge regions thereof can also be cut. For example, one or more edges of a prism of which a transverse cross-section is a parallelogram can also be cut. For the convenience of description, the cut prism is still regarded as a prism of which a transverse cross-section is a parallelogram.

In addition, in addition to the effective focal length, a concept of equivalent focal length is often used in the market. A size of the equivalent focal length is not only affected by an actual effective focal length of the optical lens, but also related to a size of the photosensitive chip. In a field of smartphones, a diagonal size of a common photosensitive chip (referring to a diagonal size of the actual photosensitive region that can receive the imageable light beam) is generally 4.5 mm-6 mm. Therefore, in the field of smartphones, in case that the effective focal length of the optical lens is 15 mm, the equivalent focal length can exceed 140 mm, in case that the effective focal length of the optical lens is 18 mm, the equivalent focal length can exceed 170 mm, and in case that the effective focal length of the optical lens is 25 mm, the equivalent focal length can exceed 240 mm. It can be seen that, by using the periscopic camera module of the present application, excellent telephoto capability can be obtained.

Further, according to an example of the present application, an electronic device based on a periscopic camera module is also provided. The electronic device may be, for example, a smartphone or a tablet. The electronic device may include the periscopic camera module described in any of the foregoing examples, wherein an incident direction of incident light of the first reflective element of the periscopic camera module is consistent with a thickness direction of the electronic device. This example can contribute to realizing a telephoto function (or a high-power zoom function) in an electronic device having a small thickness.

Further, according to a series of examples of the present application, a series of periscopic camera modules with optical image stabilization function and their assembly structures are also provided, which will be described below with reference to multiple examples.

Figure 23:
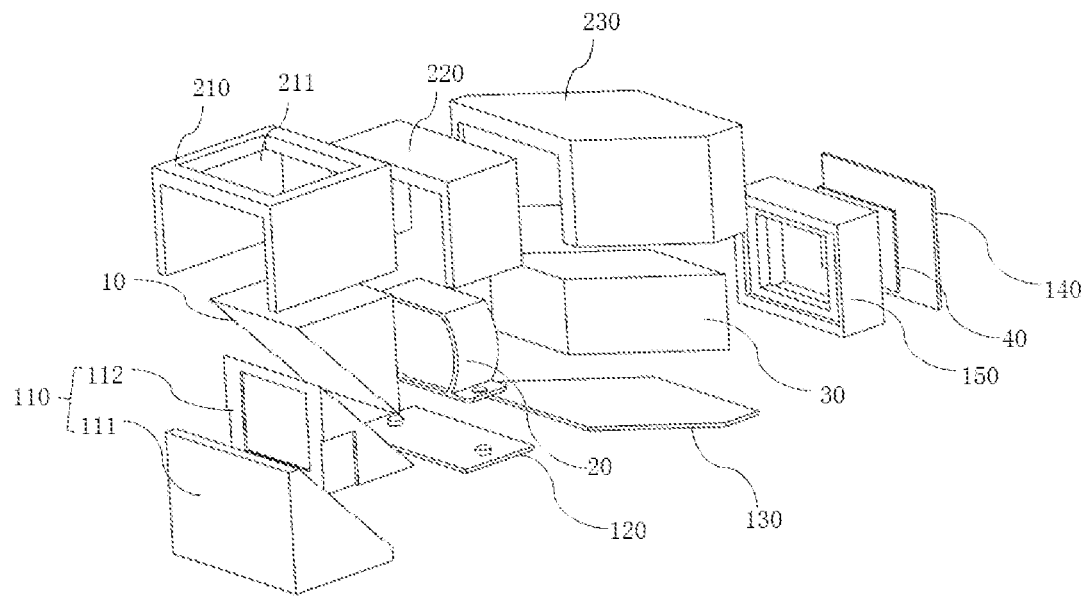
FIG. 23 shows a schematic exploded perspective view of a periscopic camera module according to an example of the present application.

FIG. 23 shows a schematic exploded perspective view of a periscopic camera module according to an example of the present application. Refer to FIG. 1 for a three-dimensional schematic diagram of an optical path and optical elements of the periscopic camera module of this example. FIG. 23 adds a series of structural components to the components shown in FIG. 1. Referring to FIG. 23, in this example, the periscopic camera module includes the first reflective element 10, the optical lens 20, the second reflective element 30 and the photosensitive chip 40 provided in sequence along the optical path. In this example, the first reflective element 10 is mounted on a first base 110, the optical lens 20 is mounted on a second substrate 120, the second reflective element 30 is a second prism and the second reflective surface is located on the side surface of the second prism, the second prism is mounted on a third substrate 130, wherein surfaces of the second substrate 120 and the third substrate 130 are both perpendicular to an incident direction of the incident light (referring to incident light entering the first optical element (the first reflective element 10) of the entire periscopic camera module). The photosensitive chip 40 is attached to a fourth substrate 140, and a surface of the fourth substrate 140 is parallel to the incident direction of the incident light (same as above, not repeated here). In this example, two mutually parallel side surfaces of the second prism constitute two of the second reflective surfaces, and all optical surfaces of the second reflective element are located on the side surfaces of the second prism, wherein the optical surface includes a reflective surface (the reflective surface includes the second reflective surface), an incident surface and an exit surface. In this example, due to the usage of a second prism of which a transverse cross-section is a parallelogram, the second prism can provide two reflective surfaces at the same time, thereby avoiding excessively large number of optical elements, and avoiding overcomplicated assembly process while realizing optical path folding.

Further, still referring to FIG. 23, in an example of the present application, the periscopic camera module may further includes a first housing 210, a second housing 220, a third housing 230 and a cylindrical bracket 150. The first housing 210 is mounted on the first base 110 and covers the first reflective element 10. A top surface of the first housing 210 may have a light window 211 for incidence of the incident light. The second housing 220 is mounted on the second substrate 120 and covers the optical lens 20. The third housing 230 is mounted on the third substrate 130 and covers the second reflective element 30. A shape of the third housing 230 can be adapted to a shape of the second reflective element 30. For example, when the second reflective element 30 is a prism of which a transverse cross section is a parallelogram, a transverse cross section of the third housing 230 can also be a parallelogram. Further, in this example, the cylindrical bracket 150 has an axis, a first open end and a second open end, the axis is perpendicular to a surface of the fourth substrate 140, the fourth substrate 140 (photosensitive chip can be attached to the surface of the fourth substrate) and mounted on the first open end, and the second open end is provided at a position directly facing the exit surface of the second reflective element 30.

Further, referring to FIG. 4, in this example, the second reflective element 30 adopts a special-shaped prism, and the prism has two groups of second reflective surfaces, wherein each group has two second reflective surfaces and these two second reflective surfaces are parallel to each other. Also, the two groups of second reflective surfaces are provided in an inverted "V" shape. The second reflective surfaces are all formed by the side surfaces of the prisms, and the two end surfaces of the prisms respectively constitute the incident surface 33 and the exit surface 34 of the second reflective element 30. More specifically, referring to FIG. 4, the two second reflective elements 31 and 32 constitute a first group, the other two second reflective elements 35 and 36 constitute a second group, and the first and the second groups together constitute the inverted "V" shape. Further, in this example, the transverse cross-section of the prism constituting the second reflective element 30 is in the inverted "V" shape. Referring to FIGS. 4 and 5, in this example, light passes through and is reflected by a reflective surface 11 on the first reflective element 10, turns 90 degrees to reach the optical lens 20 (which contains at least three lenses), and then passes through the optical lens 20, reaches the second reflective element 30 and is reflected by the second reflective surface 31. The light turns laterally by 90 degrees to reach a second one of the second reflective surface 32, and then turns laterally by 90 degrees to reach a third one of the second reflective surface 35, and then turns by 90 degrees to reach a fourth one of the second reflective surface 36, and turns 90 degrees laterally, and finally reaches the photosensitive chip. In this example, the first reflective element 10 and the second reflective element 30 are both prisms. However, it should be understood that in other examples of the present application, the first reflective element 10 and the second reflective element 30 may both be a reflect mirror, or a combination of a reflect mirror and a prism. Further, in this example, an incident direction of incident light entering the first reflective element 10 is parallel to a photosensitive surface of the photosensitive chip 40.

Further, in an example of the present application, the periscopic camera module may add a series of structural components for assembly on the basis of FIG. 4. These structures may be similar to those shown in FIG. 23. That is, in this example, the periscopic camera module may further include the first base, the second substrate, the third substrate, the fourth substrate, the first housing, the second housing, the third housing and the cylindrical bracket. Wherein, the shapes of the third substrate and the third housing can be adapted to shapes of the special-shaped prisms in this example, and the shapes and positional relationships of remaining structural components are described with reference to FIG. 6 and the corresponding text description in the previous article, and will not be repeated here.

Figure 24:
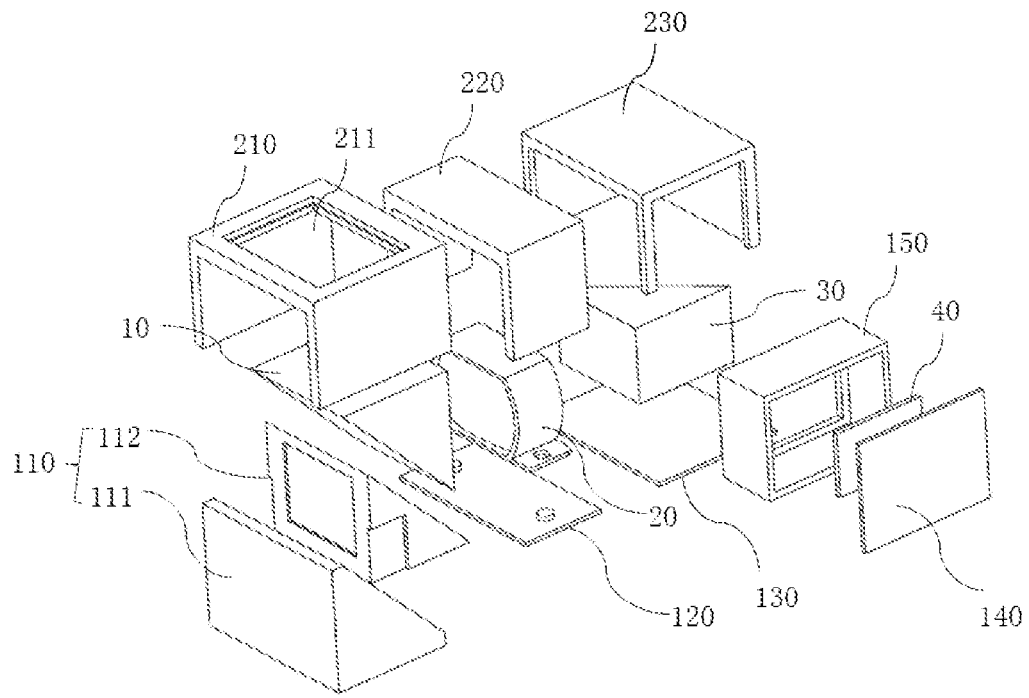
FIG. 24 shows a schematic exploded perspective view of a periscopic camera module according to another example of the present application.

It should be noted that, in the foregoing examples, the second reflective element 30 is a prism having two or more second reflective surfaces, but the second reflective element 30 of the present application is not limited thereto. For example, in another example, the second reflective element 30 may be a triangular prism. FIG. 24 shows a schematic exploded perspective view of a periscopic camera module according to another example of the present application. Referring to FIG. 24, in this example, the second reflective element 30 is a triangular prism having only one second reflective surface. Specifically, the triangular prism has an incident surface, an exit surface and a second reflective surface, wherein the second reflective surface is an inclined surface of the triangular prism. In this example, all optical surfaces of the second reflective element 30 are located on side surfaces of the triangular prism (wherein the optical surfaces include the reflective surface, the incident surface and the exit surface). In this example, an optical path is only turned laterally once in the second reflective element 30, but the optical path can still be folded to a certain extent to reduce a length of the camera module. Moreover, in this example, the shape of the second reflective element 30 is simple and the process is mature, which helps to improve production efficiency and yield. Moreover, compared with other complex shapes, the triangular prism is also easier to process a plug-in structure on the incident surface and/or the exit surface, thereby helping to further improve assembly efficiency and improve structural stability and reliability of the camera module. The triangular prism is also beneficial to combine with a driver to realize an optical image stabilization function.

Further, still referring to FIG. 24, in an example of the present application, the first reflective element 10 is a first prism, the first prism is a triangular prism, an inclined surface of the triangular prism is a reflective surface, and two mutually perpendicular side surfaces of the triangular prism serve as the incident surface and the exit surface of the first reflective element 10 respectively. The first base 110 includes a base body 111 and a first wedge-shaped support body 112 mounted in the base body 111, and an inclined surface of the first prism is mounted and bears against an inclined surface of the first wedge-shaped support body 112.

Further, still referring to FIG. 24, in one example of the present application, the optical lens 20 includes a lens barrel and at least three lenses mounted in the lens barrel. A surface of the second substrate 120 has positioning posts, a bottom of the lens barrel may have corresponding positioning holes, and the lens barrel is mounted on the second substrate 120 through engagement of the positioning holes and the positioning posts. Further, engagement between the second substrate 120 and the lens barrel can also be reinforced by glue.

Figure 25:
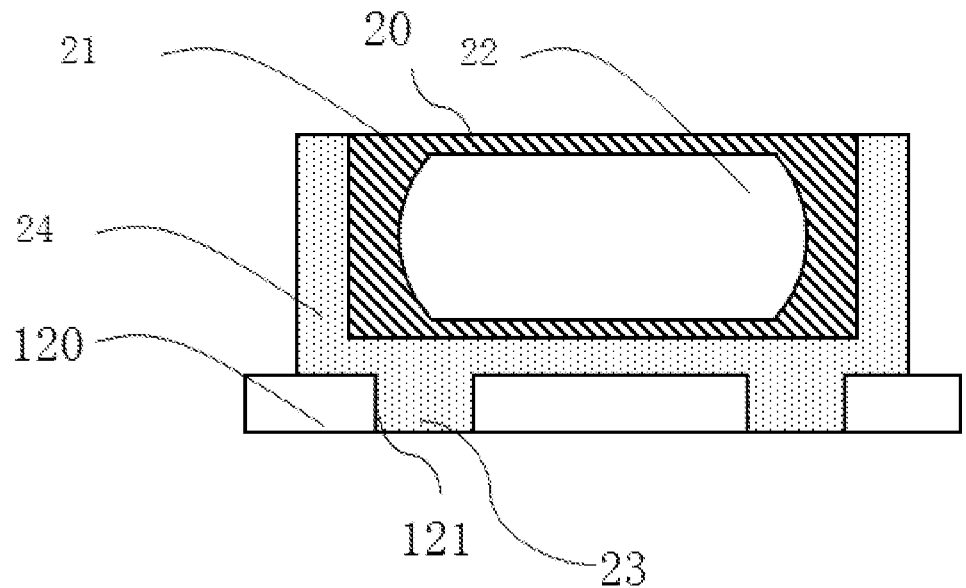
FIG. 25 shows a schematic cross-sectional view of the connection relationship between an optical lens 20 and a second substrate 120 in another example of the present application.

Further, FIG. 25 shows a schematic cross-sectional view of a connection relationship between the optical lens 20 and the second substrate 120 in another example of the present application. Referring to FIG. 25, in this example, the optical lens 20 includes the lens barrel 21 and at least three lenses 22 mounted in the lens barrel (because it is a cross-sectional view, only one of the lenses is shown). The surface of the second substrate 120 has the positioning holes 121, and the lens barrel 21 is mounted on the second substrate 120 through the engagement of the positioning posts 23 and the positioning holes 121. In this example, the lens barrel 21 can be first mounted in a positioning structure compoment 24. A bottom of the positioning structure compoment 24 has the positioning post 23, and the positioning post 23 is engaged with the positioning hole 121 of the second substrate 120. Further, the engagement between the second substrate 120 and the positioning structural compoment 24 can also be reinforced by the glue. In this example, since the lens barrel 21 does not need to directly form the positioning structure, nor does it need to process the positioning structure on the lens barrel, a manufacturing process of the lens barrel can be simplified, which helps to improve the yield.

Figure 26:
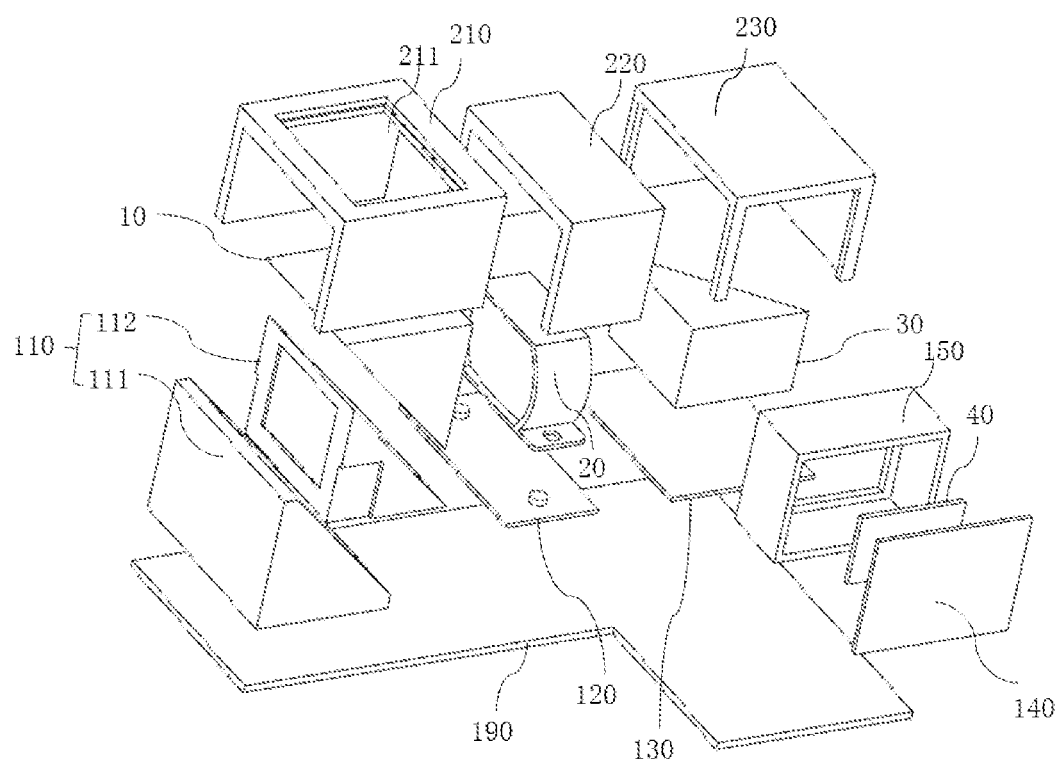
FIG. 26 shows a schematic exploded perspective view of a periscopic camera module in yet another example of the present application.

Further, FIG. 26 shows a schematic exploded perspective view of a periscopic camera module in yet another example of the present application. Referring to FIG. 26, in this example, bottom surfaces of the first base 110, the second substrate 120, the third substrate 130 and the cylindrical bracket 150 are all mounted on a same reinforcing plate 190. Other components and structures of this example are the same as those of the example in FIG. 24, and will not be described again. In this example, by adding the reinforcing plate 190, the structural strength and the bottom surface flatness of the telephoto periscopic camera module can be increased, thereby improving the imaging quality and the production yield.

Figure 27:
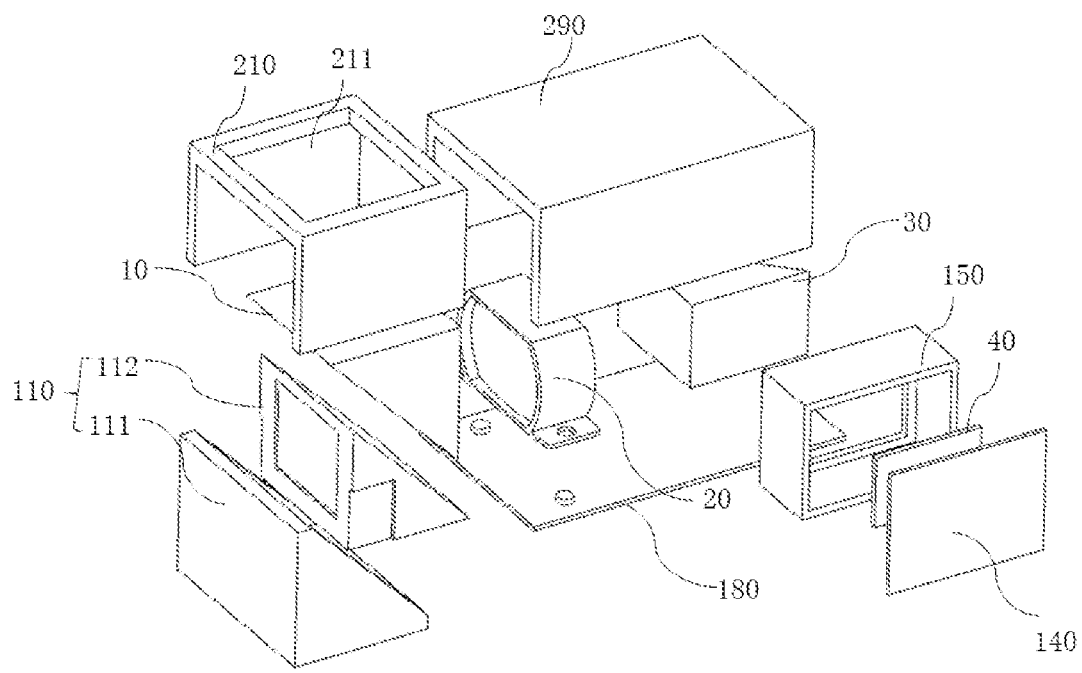
FIG. 27 shows a schematic exploded perspective view of a periscopic camera module in still another example of the present application.

Further, FIG. 27 shows a schematic exploded perspective view of a periscopic camera module in still another example of the present application. Referring to FIG. 27, in this example, the second substrate 120 and the third substrate 130 (refer to FIG. 24) share the same substrate 180 (refer to FIG. 27). Further, the second housing 220 and the third housing 230 (refer to FIG. 24) may also be the same housing 290 (refer to FIG. 27). This design can increase the consistency of the installation of the lens and the second prism, and increase the coaxiality of the lens and the prism, that is, the centers of the two can be better aligned, which reduces the complexity of the structure and the difficulty of assembly.

Figure 28:
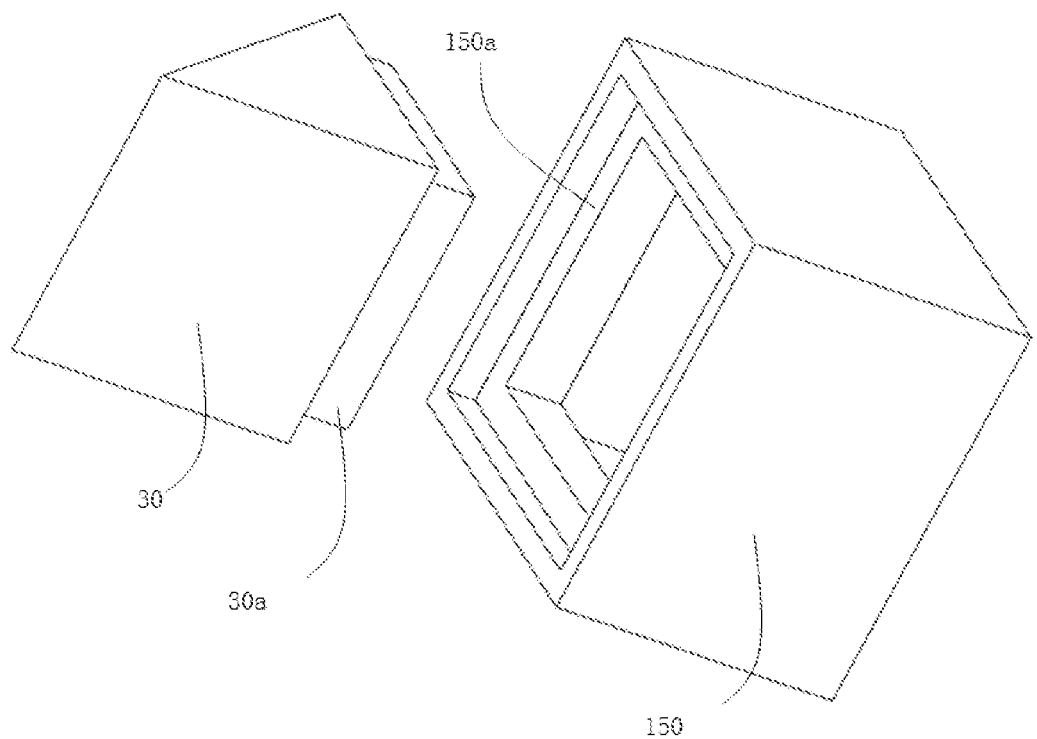
FIG. 28 shows a schematic diagram of the connection relationship between a second reflective element 30 and a cylindrical bracket 150 in an example of the present application.

Further, FIG. 28 shows a schematic diagram of a connection relationship between the second reflective element 30 and the cylindrical bracket 150 in an example of the present application. Referring to FIG. 28, in this example, the second reflective element 30 (i.e., the second prism) is a triangular prism. The cylindrical bracket 150 has an axis and a first open end and a second open end. The first open end and the second open end each have a rectangular profile. The exit surface of the second prism and the second open end have a first plug-in structure adapted to each other, and the second prism is fitted with the cylindrical bracket 150 through the first plug-in structure. Specifically, in this example, a boss 30a for plugging can be processed on the exit surface of the second prism, the second open end of the cylindrical bracket 150 has a mounting groove 150a, and the boss 30a can be embedded in the mounting groove 150a. In other words, the boss 30a and the mounting groove 150a can constitute the first plug-in structure adapted to each other. An adhesive material may be provided at a connection position of the first plug-in structure to reinforce the fitting of the second prism and the cylindrical bracket 150.

In other examples, the second prism can also be fitted with the cylindrical bracket through a prefabricated intermediate structure component, and the fitting can be reinforced with the glue. The second prism can also be fitted with the lens barrel through the prefabricated intermediate structure component, and the fitting can also be reinforced with the glue. Wherein, the intermediate structural component and the second prism can be separately formed and then fitted or bonded, and then the intermediate structural component is fitted with the cylindrical bracket or the lens barrel through the first plug-in structure.

Figure 29:
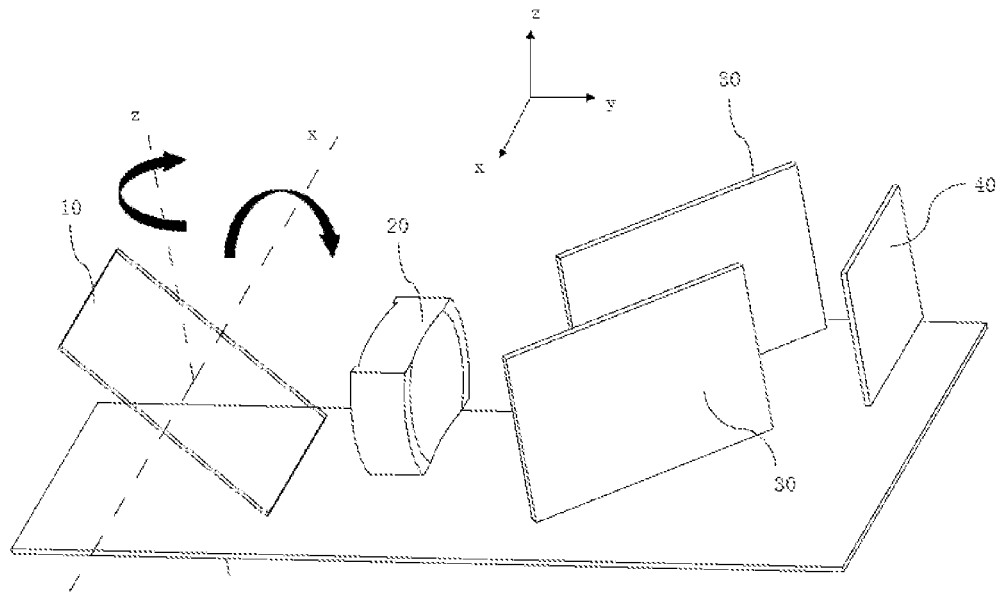
FIG. 29 shows a schematic perspective view of a periscopic camera module with an optical image stabilization function according to an example of the present application.
Figure 30:
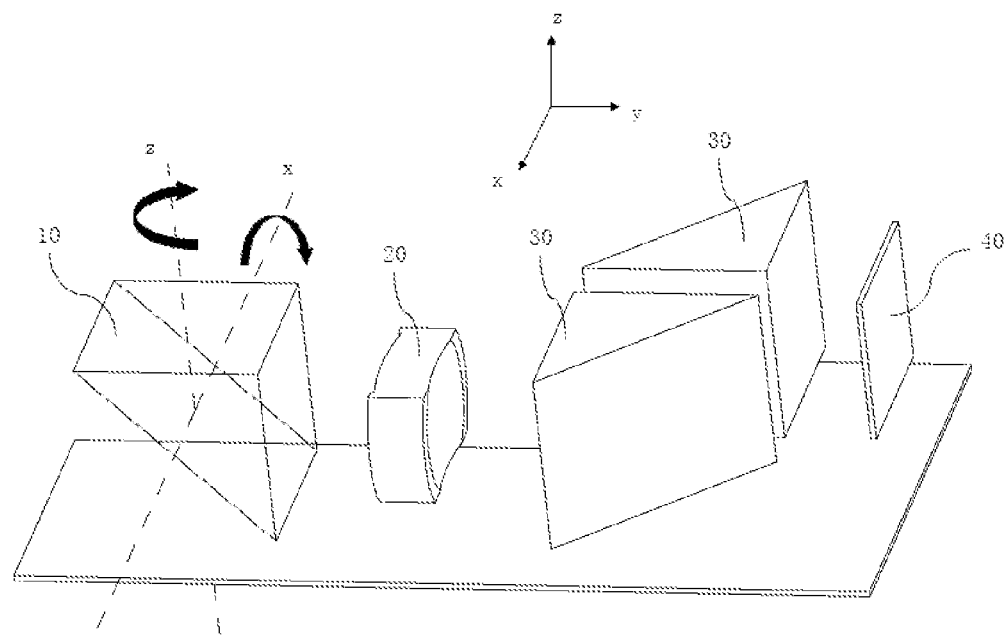
FIG. 30 shows a schematic perspective view of a periscopic camera module with an optical image stabilization function according to another example of the present application.

Further, FIG. 29 shows a schematic perspective view of a periscopic camera module with an optical image stabilization function according to an example of the present application. Referring to FIG. 29, in this example, the first reflective element 10 can rotate around a z-axis and a x-axis, wherein the z-axis is a coordinate axis parallel to the incident direction of the incident light, and the x-axis is a coordinate axis perpendicular to an optical axis of the optical lens 20. The optical lens 20 can be mounted on the second substrate, and the optical lens 20 can translate along a y-axis under driving of a second driving module; wherein the y-axis is a coordinate parallel to the optical axis of the optical lens 20. In this example, the second reflective element 30 includes two reflect mirrors, and the second reflective element 30 may be fixed to a substrate (e.g., the third substrate). FIG. 30 shows a schematic perspective view of a periscopic camera module with an optical image stabilization function according to another example of the present application. In this example, the first reflective element 10 is a triangular prism, the second reflective element 20 includes two triangular prisms, and all optical surfaces of the second reflective element 20 are located on the side surfaces of the triangular prism, wherein the optical surfaces include the reflective surface, the incident surface and the exit surface, the reflective surface includes the second reflective surface, and the second reflective surface can turn the light beam laterally.

Figure 31:
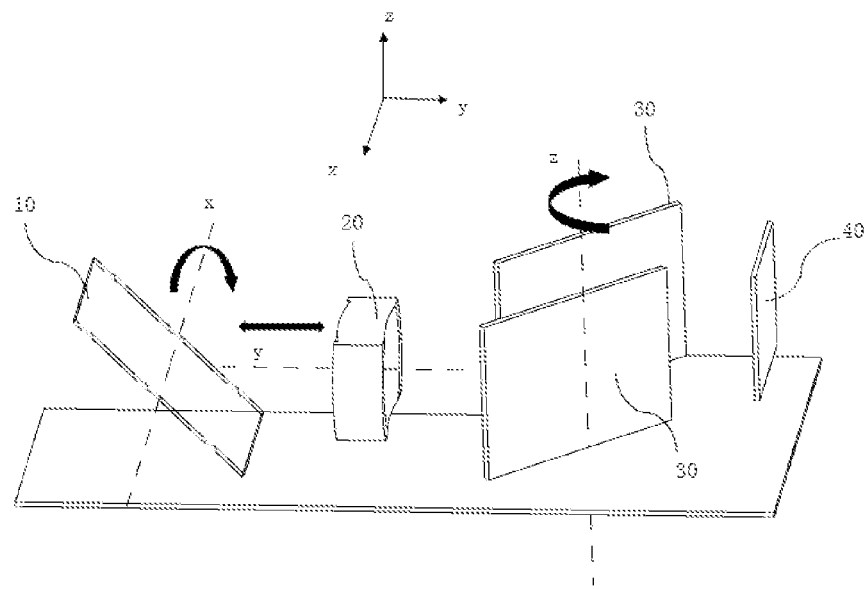
FIG. 31 shows a perspective view of a periscopic camera module with optical image stabilization function according to yet another example of the present application.

The remaining parts of the periscopic camera module of this example may be the same as the example of FIG. 29, and will not be described again. Further, FIG. 31 shows a schematic perspective view of a periscopic camera module with an optical image stabilization function according to yet another example of the present application. Referring to FIG. 31, in this example, the first reflective element 10 can rotate around the x-axis under driving of a first driving module. The optical lens 20 is mounted on the second substrate, and the optical lens 20 can translate along the y-axis under the driving of the second driving module. The second reflective element 30 is mounted on the third substrate. The second reflective element 30 can rotate around the z-axis under driving of a third driving module. Surfaces of the second substrate and the third substrate are both perpendicular to the z-axis. In this example, the first reflective element 10 may only have a degree of freedom of movement that rotates around the x-axis, that is, does not provide a degree of freedom to rotate around the z-axis. At the same time, the second reflective element 30 has the degree of freedom to rotate around the z-axis. Under this design, both of the first reflective element 10 and the second reflective element 30 only need to provide one degree of freedom of rotation, so driving module thereof can be greatly simplified, the structural complexity can be reduced, and the mass production efficiency and yield can be improved. On the other hand, with the cooperation of the rotation of the first reflective element around the x-axis and the rotation of the second reflective element around the z-axis, shaking of a photographed image in multiple directions can be well suppressed, therefore, it is enough to meet the anti-shake requirements of mobile phones (or other portable electronic devices) in most application scenarios in the camera field.

Similarly, in another example of the present application, the first reflective element may only have a degree of freedom of movement that rotates around the z-axis, ie, does not provide a degree of freedom to rotate around the x-axis. At the same time, the second reflective element still has the freedom to rotate around the z-axis. Under this design, both of the first reflective element and the second reflective element only need to provide one degree of freedom of rotation, so the driving module can be greatly simplified, the structural complexity can be reduced, and the mass production efficiency and yield can be improved. On the other hand, with the coordination of the rotation of the first reflective element around the z-axis and the rotation of the second reflective element around the z-axis, the shaking of the captured image in multiple directions can be well suppressed, therefore, it is enough to meet the anti-shake requirements of mobile phones (or other portable electronic devices) in most application scenarios in the field of photography.

Figure 32:
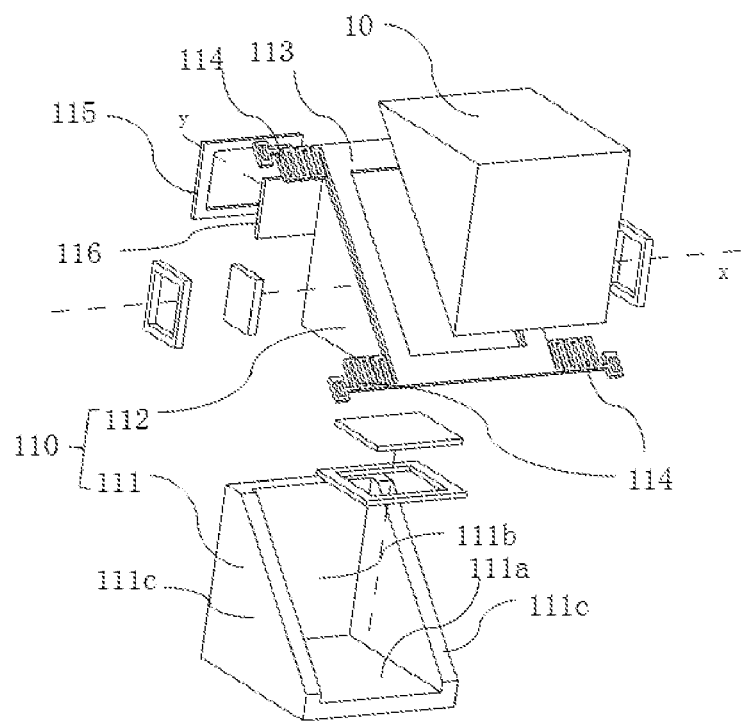
FIG. 32 shows a schematic diagram of a first reflective element 10 and its installation structure in an example of the present application.
Figure 33:
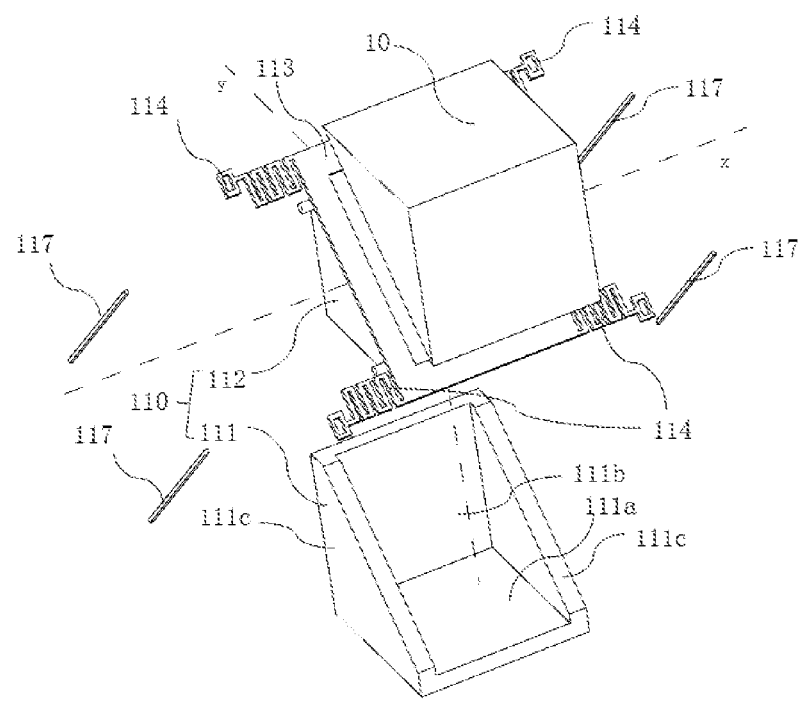
FIG. 33 shows a schematic diagram of a first reflective element 10 and its installation structure in another example of the present application.

Further, FIG. 32 shows a schematic diagram of a first reflective element 10 and its installation structure in an example of the present application. Referring to FIG. 32, in this example, the first reflective element 10 is mounted on the first base 110, and the first base 110 includes a base body 111 and a first wedge-shaped support body 112, wherein the base body 111 includes a base bottom plate 111a, a base back plate 111b and two base side plates 111c, the first wedge-shaped support body 112 is mounted in the base body 111, and the first wedge-shaped support body 112 and is movably connected to the base body 111. An inclined surface of the first wedge-shaped support body 112 can be mounted with the first reflective element 10. Specifically, the first reflective element may be a first prism, and the first prism is a triangular prism of which an inclined surface bears against and is fixed on the inclined surface of the first wedge-shaped support body 112. The first wedge-shaped support body 112 is elastically connected to the base body 111 through a frame-shaped elastic element 113, and the inclined surface of the first prism can bear against the first wedge-shaped support body through the frame-shaped elastic element 113. The frame-shaped elastic element 113 has a plurality of elastic pieces 114 connecting the frame-shaped elastic element 113 to the base body 111. The first driving module may be a voice coil motor, and the voice coil motor includes a coil 115 and a magnet 116, and the coil 115 and the magnet 116 may be respectively mounted on the base body 111 and the first wedge-shaped support body 112. The first drive module may include a z-axis rotation module and an x-axis rotation module; wherein the z-axis rotation module may include two sets of coils and magnets, wherein one set of coils and magnets are respectively mounted on one of two base side walls 111c and a corresponding side surface of the first wedge-shaped support body 112, and the other set of coils and magnets are respectively mounted on the other of the two base side walls 111c and the corresponding side surface of the first wedge-shaped support body 112; the x-axis rotation module also comprises two sets of coils and magnets, wherein one set of coils and magnets are respectively mounted on the base bottom plate 111a and the bottom surface of the first wedge-shaped support body 112, the other set of coils and magnets are respectively mounted on the base back plate 111b and a back surface of the first wedge-shaped support body 112. This design can realize the function that the first reflective element can rotate around the z-axis and the x-axis at a relatively small volume cost, so as to provide a strong optical anti-shake capability for the periscopic camera module, while avoiding the volume of the module being too large. In other examples, the first driving module may also be an SMA driver, a MEMS driver, a ball motor or other drivers suitable for driving the first reflective element to rotate around an axis. FIG. 33 shows a schematic diagram of the first reflective element 10 and its installation structure in another example of the present application. In this example, an SMA driver is used as the driving module, that is, a SMA driver 117 is used to drive the first reflective element 10 to move (e.g., rotation around the z-axis and/or around the x-axis). In this example, the SMA driver can replace the voice coil motor, and the remaining of the structure is the same as that of the example in FIG. 15, and will not be repeated here.

Figure 34:
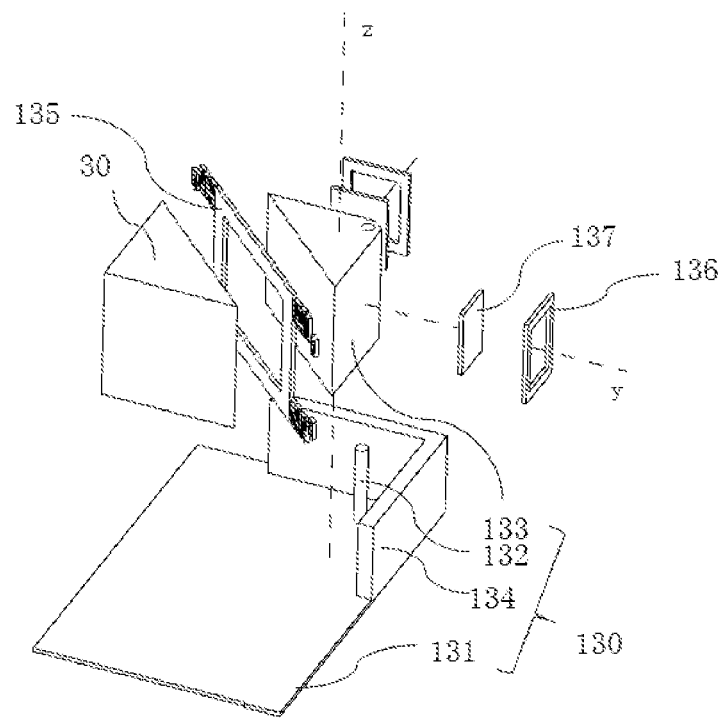
FIG. 34 shows a schematic diagram of a second reflective element 30 and its installation structure in an example of the present application.

Further, FIG. 34 shows a schematic diagram of the second reflective element 30 and its installation structure in an example of the present application. Referring to FIG. 34, in this example, the third substrate 130 may include a third bottom plate 131, a third rotating shaft 132 and a second wedge-shaped support 133, the third rotating shaft 132 is fixed on the third bottom plate 131 and perpendicular to the third bottom plate 131. The second wedge-shaped support body 133 has a bearing hole adapted to the third rotating shaft 132 and is rotatably connected with the third rotating shaft 132. The second reflective element 30 is fixed with the second wedge-shaped support body 133. The third substrate 130 may further include a third side plate 134, and the second wedge-shaped support body 133 is elastically connected to the third side plate 134 through a frame-shaped elastic element 135. The second reflective element 30 may be a second prism, the second prism may be a triangular prism, and an inclined surface of the second prism bears against an inclined surface of the second wedge-shaped support body 133 through the frame-shaped elastic element 135. The third drive module is a voice coil motor. The voice coil motor includes a coil 136 and a magnet 137. The coil and the magnet can be respectively mounted on the third side plate 134 and a corresponding side surface of the second wedge-shaped support body 133. The design of this example can realize the function of rotating the second reflective element around the z-axis at a relatively small volume cost, so as to provide a strong optical anti-shake capability for the periscopic camera module, while avoiding the volume of the camera module being too large.

Further, in an example of the present application, the second reflective element includes at least two second reflective surfaces, and the second reflective surfaces are 45-degree reflective surfaces; the first reflective element has a first reflective surface, the first reflective surface is a 45-degree reflective surface. The optical lens has an effective focal length greater than or equal to 18 mm or a field angle of less than or equal to 20 degrees. Preferably, the optical lens has an effective focal length greater than or equal to 25 mm or a field angle of less than or equal to 15 degrees.

Further, in an example of the present application, a transverse cross section of a second prism is a parallelogram, and two mutually parallel side surfaces of the second prism constitute two second reflective surfaces, and all optical surfaces of the second reflective element are located on side surfaces of the second prism, wherein the optical surfaces include a reflective surface, an incident surface and an exit surface, and the reflective surface includes the second reflective surface.

Further, in an example of the present application, the periscopic camera module may further include a connector and a flexible connecting tape. The connector can be connected to a base body by a flexible connecting tape. The base body may be a first base, a second substrate, a third substrate or a fourth substrate. There can be only one connector or more than one. In case that there are multiple connectors, these connectors may be connected to different base bodies through different flexible connecting tapes, respectively.

Figure 35:
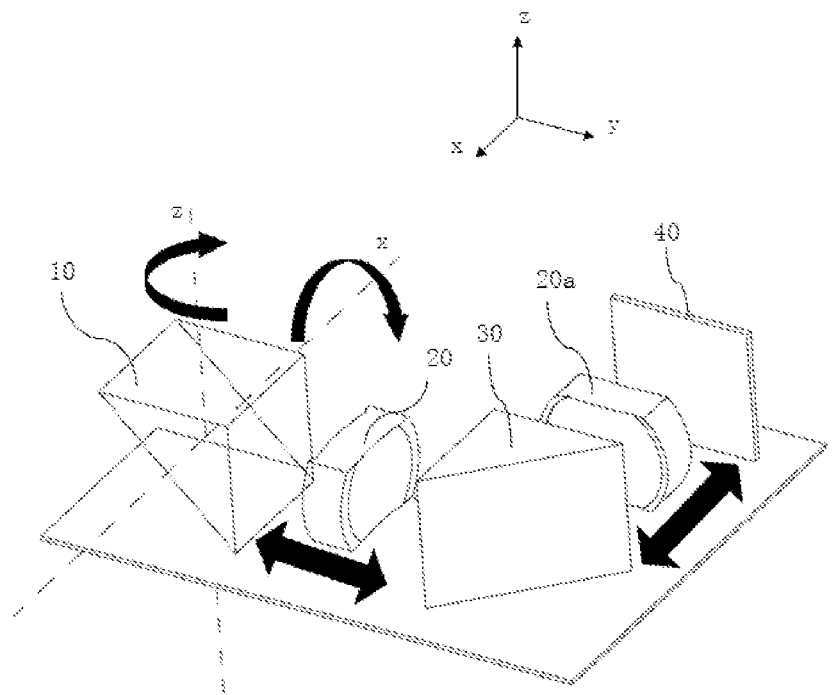
FIG. 35 shows a schematic perspective view of a periscopic zoom camera module according to an example of the present application.

Furthermore, FIG. 35 shows a schematic perspective view of a periscopic zoom camera module according to an example of the present application. Referring to FIG. 35, in this example, the optical lens 20 located between the first reflective element 10 and the second reflective element 30 may be a focus adjusting lens, and a focusing lens 20a may be added between the second reflective element 30 and the photosensitive chip 40, the focus adjusting lens and the focusing lens 20a together constitute an imaging optical system of the camera module. Herein, the focus adjusting lens can be translated along the y-axis under the driving of the second driving module, and the focusing lens 20a can be translated along the x-axis under the driving of the fourth driving module (in this example, the first reflective element 10 and the second reflective element 30 all use triangular prisms). The focus adjusting lens can adopt a lens group with certain optical parameters, so that an effective focal length of the imaging optical system of the camera module is sensitive to the translation of the focus adjusting lens along the y-axis, thereby realizing focus adjusting. The focusing lens 20a can use a lens group with certain optical parameters, so that the effective focal length of the imaging optical system of the camera module is not sensitive to the translation of the focusing lens along the x-axis, and a back focus of the imaging optical system is sensitive to the translation of the focusing lens along the x-axis. Under this design, through the controlled movement of the focus adjusting lens, the zoom function can be realized on the basis of the telephoto module. At the same time, for the problem of out-of-focus on the photosensitive surface caused by focus adjusting, It can be solved by the controlled movement of the focusing module 20*a*. Moreover, in this example, moving lines of the focusing module and the focus adjusting module 20*a* are perpendicular to each other, which is beneficial to reduce the length of the camera module. Further, in this example, the first reflective element 10 can be rotated around the z-axis and around the x-axis under the driving of the first driving module. In this example, the periscopic camera module is a telephoto camera module and has the function of optical zoom, so the periscopic camera module is more sensitive to optical shake, and requires more optical image stabilization. The first reflective element 10 rotates around the Z-axis and the X-axis in two directions to realize optical image stabilization in two directions, which can better overcome the picture problem caused by the jitter of the zoom module. In addition, it should be noted that although in this example, the focus adjusting lens and the focusing lens together constitute the imaging optical system, since the movement of the focusing lens is not sensitive to the effective focal length of the imaging optical system, it mainly plays the role of adjusting the back focus, and also that is to say, the influence of the focusing lens on the imaging optical system itself is relatively small, so in this application, the light beam output by the focus adjusting lens can be regarded as an imageable light beam (or can be approximated as an imageable light beam).

Figure 36:
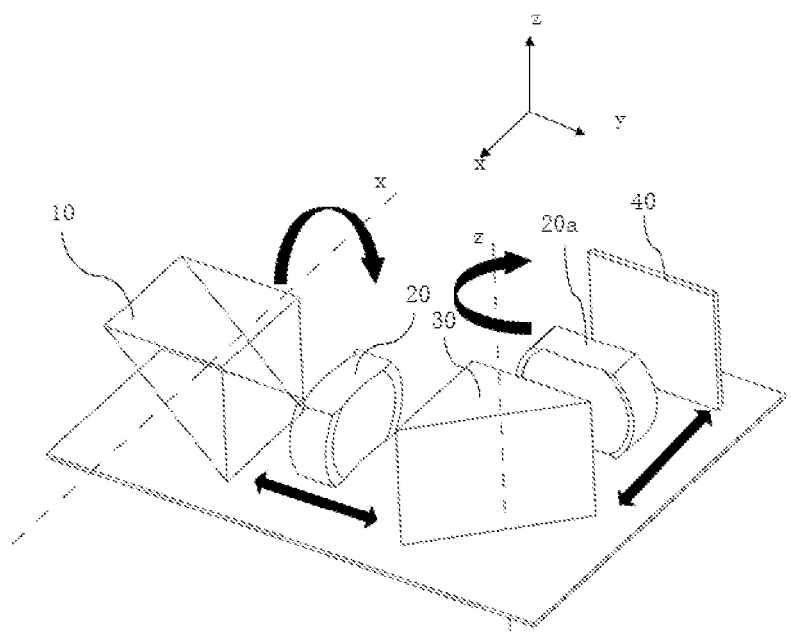
FIG. 36 shows a schematic perspective view of a periscopic zoom camera module according to another example of the present application.

Further, FIG. 36 shows a schematic perspective view of a periscopic zoom camera module according to another example of the present application. Different from the previous example, in this example, the first reflective element 10 reduces one degree of freedom of movement, and only rotates around the x-axis. Meanwhile, the second reflective element 30 may rotate around the z-axis. Under this design, both of the first reflective element 10 and the second reflective element 30 only need to provide one degree of freedom of rotation, so driving module thereof can be greatly simplified, the structural complexity is reduced, and it is very beneficial to improve mass production efficiency and yield. On the other hand, by coordinating the rotation of the first reflective element 10 around the x-axis with the rotation of the second reflective element 30 around the z-axis, the shaking of the photographed image in multiple directions can be well suppressed, so it is enough to meet the anti-shake requirements of mobile phones (or other portable electronic devices) in most application scenarios in the field of photography. In addition, this example can also implement a zoom function, which greatly improves user experience.

Figure 37:
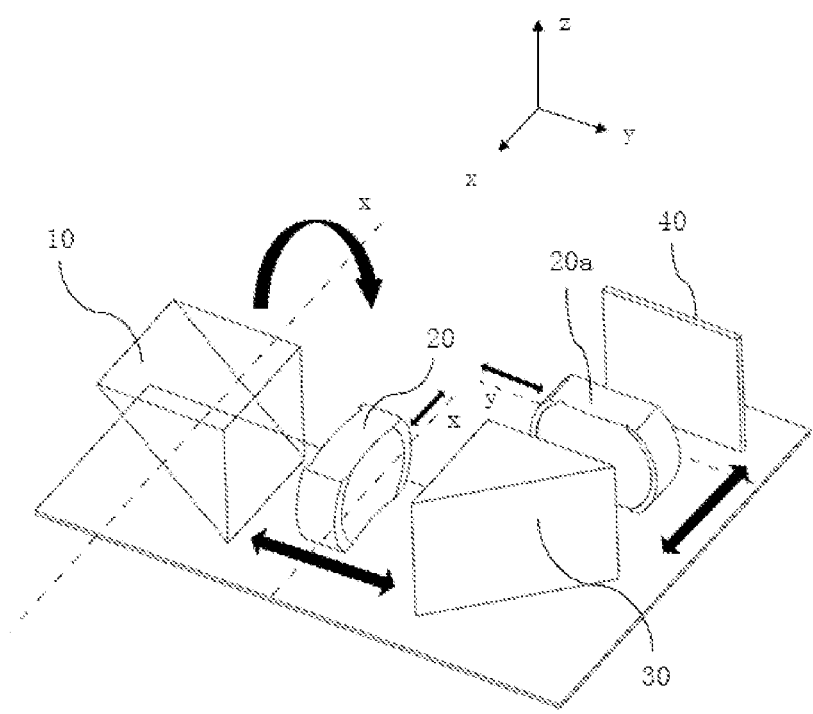
FIG. 37 shows a schematic perspective view of a periscopic zoom camera module according to yet another example of the present application.

Further, FIG. 37 shows a schematic perspective view of a periscopic zoom camera module according to yet another example of the present application. Referring to FIG. 37, in this example, compared with the example of FIG. 35, the first reflective element 10 reduces one degree of freedom of movement, and only rotates around the x-axis. At the same time, the focus adjusting lens can not only translate along the y-axis, but also along the x-axis, and the focusing lens can not only translate along the y-axis, but also along the x-axis. Under this design, the first reflective element 10 only needs to provide one degree of freedom of rotation, so the driving module thereof can be greatly simplified, the structural complexity is reduced, and it is very beneficial to improve mass production efficiency and yield. On the other hand, by coordinating the rotation of the first reflective element 10 around the x-axis with the translation of the focus adjusting lens and the focusing lens 20*a* in the respective directions perpendicular to the optical axes, the shaking of the photographed image in multiple directions can be well suppressed, so it is enough to meet the anti-shake requirements of mobile phones (or other portable electronic devices) in most application scenarios in the field of photography. In addition, this example can also implement a zoom function, which greatly improves user experience.

It should be noted that in this application, an edge region of an optical surface of prism is usually an optically invalid region, that is, the edge region of the optical surface may not pass light. At this time, in order to save volume or other purposes, part of the edge region of the prism can be cut (such as cutting an edge or edges). For example, in some examples of the present application, the first reflective element may be a variation of a triangular prism, such as a prism after cutting at least one edge of the triangular prism. For the convenience of description, a prism obtained by cutting one or more edges of the triangular prism at the edge region is still regarded as a triangular prism. Similarly, in case that prisms are used for the second reflective element, the prisms in the edge regions thereof can also be cut. For example, one or more edges of a prism of which a transverse cross-section is a parallelogram can also be cut. For the convenience of description, the cut prism is still regarded as a prism of which a transverse cross-section is a parallelogram.

Further, according to an example of the present application, an electronic device based on a periscopic camera module is also provided. The electronic device may be, for example, a smartphone or a tablet. The electronic device may include the periscopic camera module described in any of the foregoing examples, wherein the incident direction of incident light of the first reflective element of the periscopic camera module is consistent with a thickness direction of the electronic device. The present example can contribute to realizing a telephoto function (or a high-power zoom function) in an electronic device having a small thickness.

The above description is only a preferred example of the present application and an illustration of the applied technical principles. Those skilled in the art should understand that the scope of this application is not limited to the technical solution formed by the specific combination of the above-mentioned technical features, and should also cover other technical solutions formed by any combination of the above-mentioned technical features and its equivalent features without departing from the inventive concept. For example, a technical solution is formed by replacing the above-mentioned features with the technical features disclosed in this application (but not limited to) with similar functions.

The invention claimed is:

1. A periscopic camera module, characterized by comprising:
   a first reflective element, including a first reflective surface for reflecting incident light to turn it longitudinally;
   an optical lens, for receiving light reflected by the first reflective element and outputting an imageable light beam to an image side;
   a second reflective element, including at least one second reflective surface adapted to laterally turn the imageable light beam at least once; and
   a photosensitive chip, adapted to receive the imageable light beam laterally turned by the second reflective element;
   wherein, among all optical surfaces of the first reflective element and the second reflective element, at least one of the optical surfaces has a light-blocking structure, and the light-blocking structure is provided only at an edge region of the at least one optical surface, and a light-passing hole is formed in only a center of the light-blocking structure, and the optical surface includes a reflective surface, an incident surface or an exit surface, and the reflective surface includes the first reflective surface or the second reflective surface; and wherein the light-blocking structure is provided on a plurality of the optical surfaces, and the light-blocking structure includes a first light-blocking structure and a second light-blocking structure, and the first light-blocking structure has a circular or oval light-passing hole, and the second light-blocking structure has a rectangular light-passing hole, and the first light-blocking structure is provided in one or more optical surfaces close to an object side, and the second light-blocking structure is provided on one or more optical surfaces close to the image side.

2. The periscopic camera module according to claim 1, wherein the first reflective element is a prism, and the prism includes an incident surface and an exit surface, and the light-blocking structure is provided on an edge region of the incident surface and/or an edge region of the exit surface.

3. The periscopic camera module according to claim 1, wherein the second reflective element is a prism, and the prism includes an incident surface and an exit surface, and the light-blocking structure is provided on an edge region of the incident surface and/or an edge region of the exit surface.

4. The periscopic camera module according to claim 1, wherein the first reflective element and/or the second reflective element is a reflect mirror, and the reflect mirror has a reflective surface, and the light-blocking structure is provided on an edge region of the reflective surface.

5. The periscopic camera module according to claim 3, wherein the first reflective surface is a 45-degree reflective surface, and the second reflective element includes at least two second reflective surfaces, and the second reflective surface is a 45-degree reflective surface.

6. The periscopic camera module according to claim 5, wherein a transverse cross section of the second reflective element is a parallelogram, and two mutually parallel side surfaces of the second reflective element constitute two of the second reflective surfaces, and two end surfaces of the second reflective element respectively constitute the incident surface and the exit surface of the second reflective element.

7. The periscopic camera module according to claim 5, wherein the second reflective element includes a plurality of groups of the second reflective surfaces, each group has two second reflective surfaces and the two second reflective surfaces are parallel to each other, and any two adjacent groups of the second reflective surfaces are arranged in a "V" shape or an inverted "V" shape; and the second reflective element is a single prism, and a side surface of the prism constitutes the second reflective surface, and two end surfaces of the prism respectively constitute the incident surface and the exit surface of the second reflective element.

8. The periscopic camera module according to claim 6, wherein the light-blocking structure is provided on the second reflective surface.

9. The periscopic camera module according to claim 8, wherein the light-blocking structure is further provided on the incident surface and/or the exit surface of the second reflective element.

10. The periscopic camera module according to claim 8, wherein the light-blocking structure is further provided on the first reflective surface, the incident surface and/or the exit surface of the first reflective element.

11. The periscopic camera module according to claim 1, wherein the first reflective element is a triangular prism, and an inclined surface of the triangular prism is the first reflective surface, and two mutually perpendicular side surfaces of the triangular prism are the incident surface and the exit surface of the first reflective element, respectively.

12. The periscopic camera module according to claim 11, wherein the incident surface of the first reflective element has a visible light anti-reflective coating film and a color filter film; or the exit surface of the first reflective element has a visible light anti-reflective coating film and a color filter film; or the incident surface of the first reflective element has a visible light anti-reflective coating film, and the exit surface of the first reflective element has a color filter film.

13. The periscopic camera module according to claim 11, wherein the second reflective element is a prism, and the second reflective element has an incident surface and an exit surface; and at least one of four optical surfaces of the incident surface and the exit surface of the first reflective element, and the incident surface and the exit surface of the second reflective element has a visible light anti-reflective coating film, and at least one of the four optical surfaces has a color filter film.

14. The periscopic camera module according to claim 1, wherein at least one of the optical surfaces of the first reflective element and the second reflective element has a visible light anti-reflective coating film, and at least one of the optical surfaces has a color filter film, and both of the visible light anti-reflective coating film and the color filter film are provided in the light-passing holes of the light-blocking structure.

15. The periscopic camera module according to claim 14, wherein the visible light anti-reflective coating film and the color filter film are located on the same optical surface or respectively located on different optical surfaces.

16. The periscopic camera module according to claim 1, wherein the optical lens includes at least three lenses, and an outline of clear aperture of the lens is circular or at least a part of the outline is arc-shaped.

17. The periscopic camera module according to claim 1, wherein the light-blocking structure is a thin film fabricated on the optical surface of the first reflective element or the second reflective element by silk screen printing, plating, coating or ink printing process; or the light-blocking structure is a light-blocking member directly formed on the optical surface of the first reflective element or the second reflective element; or an annular groove is provided on the optical surface of the first reflective element or the second reflective element, and the light-blocking structure is a pre-shaped light-blocking member embedded in the annular groove.

18. An electronic device, characterized by comprising: the periscopic camera module according to claim 1, wherein an incident direction of the incident light of the first reflective element is the same as that of a thickness direction of the electronic device.

* * * * *